United States Patent
Kim et al.

(10) Patent No.: US 10,168,772 B2
(45) Date of Patent: Jan. 1, 2019

(54) HEAD MOUNTED ELECTRONIC DEVICE

(71) Applicant: Samsung Electronics Co., Ltd., Gyeonggi-do (KR)

(72) Inventors: Jung Soo Kim, Gyeonggi-do (KR); Heon Chol Kim, Seoul (KR); Joo Namkung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 113 days.

(21) Appl. No.: 15/291,548

(22) Filed: Oct. 12, 2016

(65) Prior Publication Data

US 2017/0102767 A1    Apr. 13, 2017

(30) Foreign Application Priority Data

Oct. 12, 2015 (KR) .................. 10-2015-0142026

(51) Int. Cl.
| | | |
|---|---|---|
| *G06F 3/01* | (2006.01) | |
| *G02B 27/01* | (2006.01) | |
| *G02B 27/00* | (2006.01) | |
| *H04N 13/344* | (2018.01) | |
| *H04N 13/383* | (2018.01) | |
| *H04N 13/327* | (2018.01) | |

(52) U.S. Cl.
CPC ......... *G06F 3/013* (2013.01); *G02B 27/0093* (2013.01); *G02B 27/0172* (2013.01); *H04N 13/327* (2018.05); *H04N 13/344* (2018.05); *H04N 13/383* (2018.05)

(58) Field of Classification Search
CPC .. G06F 3/013; H04N 13/0425; H04N 13/044; H04N 13/0484; G02B 27/0093; G02B 27/0172
USPC ............................................................ 345/8
See application file for complete search history.

(56) References Cited

U.S. PATENT DOCUMENTS

| | | | |
|---|---|---|---|
| 8,611,015 B2 | 12/2013 | Wheeler et al. | |
| 8,786,953 B2 | 7/2014 | Wheeler et al. | |
| 8,810,600 B2 | 8/2014 | Bohn et al. | |
| 2013/0128364 A1* | 5/2013 | Wheeler ................ | A61B 3/113 359/630 |
| 2013/0187943 A1 | 7/2013 | Bohn et al. | |
| 2014/0055846 A1 | 2/2014 | Wheeler et al. | |
| 2016/0091722 A1* | 3/2016 | Liu .................... | G02B 27/0172 345/8 |

* cited by examiner

*Primary Examiner* — Vinh T Lam
(74) *Attorney, Agent, or Firm* — The Farrell Law Firm, P.C.

(57) ABSTRACT

An electronic device is provided. The electronic device mountable on a head of a user includes a display, a sensor configured to capture an image, a processor electrically connected with the display and the sensor, and a memory electrically connected with the processor, wherein the memory includes instructions, which, when executed, cause the processor to provide a guide screen that guides the user to gaze at a front of a display, to capture an image, in which at least a portion of an eye of the user is included, using the sensor, and to determine a wearing state of the electronic device based on at least one of a location of the eye or a location of a pupil of the user displayed in the captured image.

13 Claims, 24 Drawing Sheets

PIP mode

See-through mode

HEAD MOUNTED ELECTRONIC DEVICE

PRIORITY

This application claims priority under 35 U.S.C. § 119(a) to Korean Patent Application Serial No. 10-2015-0142026, which was filed on Oct. 12, 2015 in the Korean Intellectual Property Office, the entire disclosure of which is incorporated herein by reference.

BACKGROUND

1. Field of the Disclosure

The present disclosure relates to a method that is performed at a head-mounted electronic device.

2. Description of the Related Art

An electronic device may provide a variety of functions depending on recent trends in digital convergence. For example, a smartphone supports various functions such as an Internet connection, playback of music or video, capturing of an image, and the like as well as a telephone call function.

The conventional electronic device is configured such that a user carries the electronic device with his/her hand. There is increasing interest in a wearable electronic device such as a watch, which is worn on a user's wrist, or such as glasses or a helmet, which is mountable on a user's head.

A head-mounted electronic device may be adjusted such that the head-mounted electronic device fits the user's head by using a strap and the like. However, while the head-mounted electronic device may be adjusted to fit the user's head, it still may not be worn at a location which is suitable to provide a display screen for the user.

SUMMARY

The present disclosure is made to address at least the above-mentioned problems and/or disadvantages and to provide at least the advantages described below.

Accordingly, an aspect of the present disclosure provides an electronic device that may verify a wearing state, in which a user wears the electronic device, by capturing an eye of the user and may adjust a screen displayed on a display of the electronic device based on a distance between both eyes of the user.

In accordance with an aspect of the present disclosure, an electronic device mountable on a head of a user is provided. The electronic device includes a display, a sensor configured to capture an image, a processor electrically connected with the display and the sensor, and a memory electrically connected with the processor, wherein the memory includes instructions, which, when executed, cause the processor to provide a guide screen that allows the user to gaze at a front of the display, to capture an image, in which at least a portion of an eye of the user is included, using the sensor, and to determine a wearing state of the electronic device based on a location of the eye or a pupil of the user displayed in the captured image.

In accordance with another aspect of the present disclosure, a method is provided using an electronic device that is mountable on a head of a user. The method includes providing a guide screen that allows the user to gaze at a front of a display, capture an image, in which at least a portion of an eye of the user is included, using a sensor, and determine a wearing state of the electronic device based on a location of the eye or a pupil of the user displayed in the captured image.

In accordance with another aspect of the present disclosure, an electronic device is provided, which is detachably coupled to a head-mounted device mountable on a head of a user. The electronic device includes a display, a first sensor, a processor electrically connected with the display and the first sensor, and a memory electrically connected with the processor. The memory may store instructions, which, when executed by the processor, cause the processor to detect whether the electronic device is coupled to the head-mounted device, to obtain first information associated with a location of an eye of the user on the display through the first sensor of the electronic device or a second sensor included in the head-mounted device in a first state where the user wears the head-mounted device, to display a first user interface on at least a partial area of the display based at least in part on the first information, to obtain second information associated with a location of the eye of the user on the display through the first sensor or the second sensor in a second state where the user wears the head-mounted device, to change at least a portion of the first user interface so as to indicate that the first state is changed to the second state, based at least in part on the second information, and to display a second user interface in connection with the at least partially changed first user interface, based on determining that the second information is substantially the same as selected information.

In accordance with another aspect of the present disclosure, a non-transitory machine-readable storage medium is provided, which stores instructions, which, when executed by at least one processor, instruct the at least one processor to execute at least one of obtaining first information associated with a location of an eye of a user in a first state where the user wears a head-mounted device, using a sensor which is electrically connected with the processor and is included in the head-mounted device mountable on a head of the user, displaying a first user interface on at least a partial area of a display of the head-mounted device based at least in part on the first information, obtaining second information associated with a location of the eye in a second state where the user wears the head-mounted device, using the sensor, changing at least a portion of the first user interface so as to indicate that the first state is changed to the second state, based at least in part on the second information, and displaying a second user interface in connection with the at least partially changed first user interface, based on determining that the second information is substantially the same as selected information.

In accordance with another aspect of the present disclosure, a head-mounted device mountable on a head of a user is provided, which includes a camera, a first mechanism including a first light-emitting part, a first reflecting part, and a first sensor, a second mechanism including a second light-emitting part, a second reflecting part, and a second sensor, a processor electrically connected with the camera, the first mechanism, and the second mechanism, and a memory electrically connected with the processor. The memory may store instructions, which, when executed by the processor, cause the processor to obtain a first image based on the result of detecting, through the first sensor, a first reflected light that is obtained by reflecting a first light emitted from the first emitting part by the first reflecting part, to obtain a second image based on the result of detecting, through the second sensor, a second reflected light that is obtained by reflecting a second light emitted from the second emitting part by the second reflecting part, to obtain at least one stereoscopic image by using the first image and the second image, and to correct the at least one stereoscopic image by arranging the first image and the second image based on a location of an eye of the user obtained through the camera.

BRIEF DESCRIPTION OF THE DRAWINGS

The above and other aspects, advantages, and features of certain embodiments of the present disclosure will become apparent to those skilled in the art from the following detailed description, when taken in conjunction with the accompanying drawings in which:

FIG. 12 A illustrates an operation of adjusting a distance between corresponding screens which an electronic device provides to a display at the same time, according to an embodiment of the present disclosure;

Throughout the drawings, it should be noted that like reference numbers are used to depict the same or similar elements, features, and structures.

DETAILED DESCRIPTION

Figure 1:
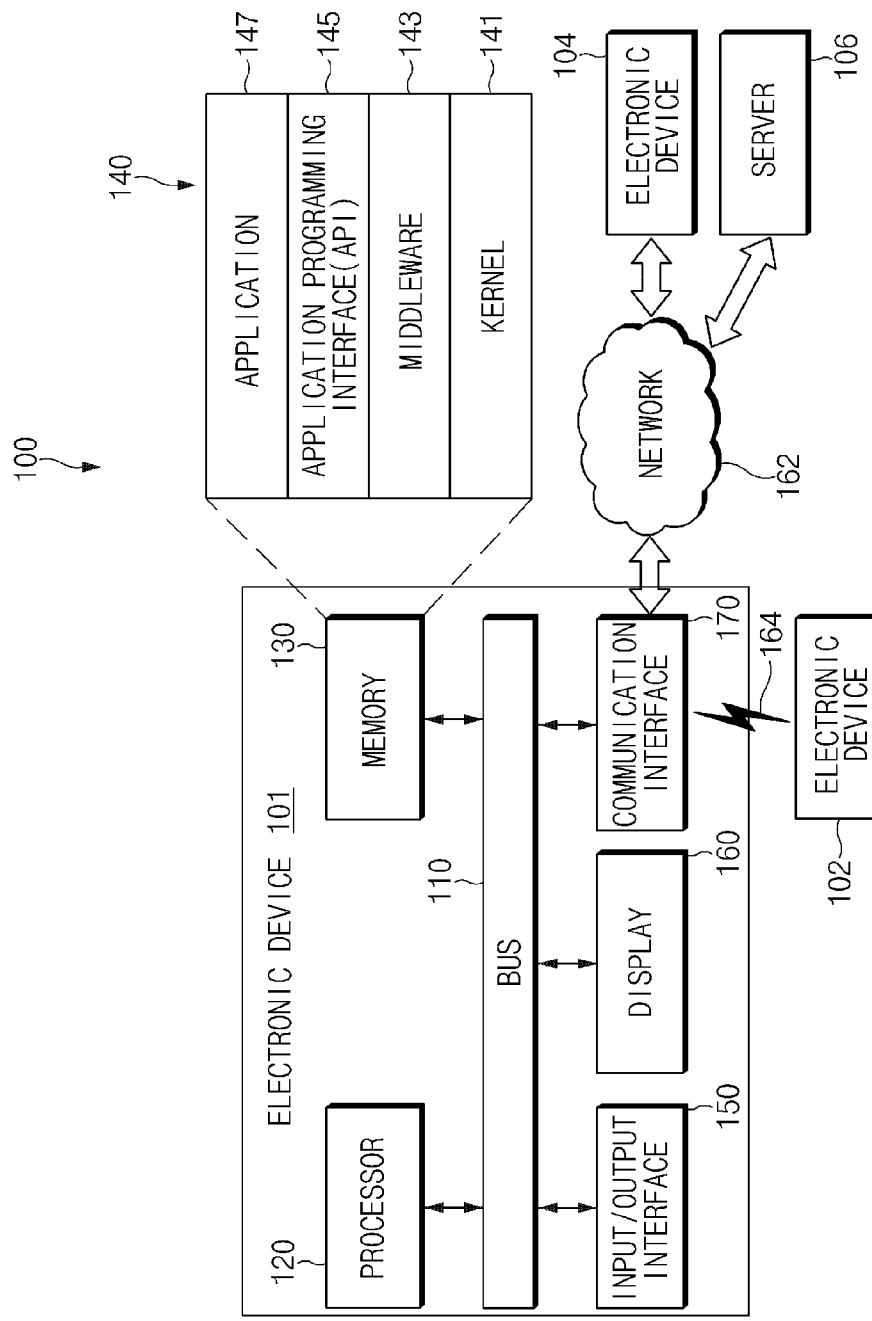
FIG. 1 is a diagram illustrating an electronic device in a network environment, according to an embodiment of the present disclosure.

Various embodiments of the present disclosure are described below with reference to accompanying drawings. Those of ordinary skill in the art will recognize that modification, equivalent, and/or alternative on the various embodiments described herein may be made without departing from the scope and spirit of the present disclosure. With regard to description of drawings, similar elements may be designated by similar reference numerals.

In the present disclosure, the expressions "have", "may have", "include", "comprise", "may include", and "may comprise" indicate the existence of corresponding features (e.g., elements such as numeric values, functions, operations, or components) but do not exclude the presence of additional features.

In the present disclosure, the expressions "A or B", "at least one of A or/and B", and "one or more of A or/and B", may include any and all combinations of one or more of the associated listed items. For example, the expression "A or B", "at least one of A and B", or "at least one of A or B" may refer to (1) where at least one A is included, (2) where at least one B is included, or (3) where both of at least one A and at least one B are included.

Terms, such as "first", "second", and the like used herein may refer to various elements, but do not limit the elements. For example, "a first user device" and "a second user device" may indicate different user devices regardless of the order or priority thereof. For example, without departing from the scope of the present disclosure, a first element may be referred to as a second element, and similarly, a second element may be referred to as a first element.

When an element (e.g., a first element) is referred to as being "operatively or communicatively coupled with/to" or "connected to" another element (e.g., a second element), it may be directly coupled with/to or connected to the other element or an intervening element (e.g., a third element)

may be present. In contrast, when an element (e.g., a first element) is referred to as being "directly coupled with/to" or "directly connected to" another element (e.g., a second element), it should be understood that there are no intervening elements (e.g., a third element).

According to the situation, the expression "configured to" as used herein may be used as, for example, the expression "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a general-purpose processor (e.g., a central processing unit (CPU) or an application processor) which performs corresponding operations by executing one or more software programs which are stored in a memory device.

Terms used in the present disclosure are used to describe specific embodiments and are not intended to limit the scope of the present disclosure. The terms of a singular form may include plural forms unless otherwise specified.

All the terms used herein, which include technical or scientific terms, may have the same meanings that are generally understood by a person skilled in the art. Further, terms, which are defined in a dictionary and commonly used, should also be interpreted as is customary in the relevant related art and not in an idealized or overly formal manner unless expressly so defined. In some cases, even if terms are terms are defined in the specification, they may not be interpreted to exclude embodiments of the present disclosure.

Electronic devices according to an embodiment of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, or wearable devices. A wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

The electronic devices may be home appliances. The home appliances may include at least one of, for example, televisions (TVs), digital versatile disc (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

The electronic devices may include at least one of medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), point of sales (POSs) terminal, or Internet of things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may include at least one of parts of furniture or buildings/structures, electronic boards, electronic signature receiving devices, projectors, or various measuring instruments (e.g., water meters, electricity meters, gas meters, or wave meters, and the like). The electronic device may be one of the above-described devices or a combination thereof. An electronic device may be a flexible electronic device. Furthermore, an electronic device may not be limited to the above-described electronic devices and may include other electronic devices and new electronic devices according to the development of new technologies.

Herein, the term "user" may refer to a person who uses an electronic device or may refer to a device (e.g., an artificial intelligence electronic device) that uses an electronic device.

Referring to FIG. 1, an electronic device 101 includes a bus 110, a processor 120, a memory 130, an input/output interface 150, a display 160, and a communication interface 170. Alternatively, the electronic device 101 may omit at least one of the above-described elements and/or may further include other element(s).

The bus 110 may interconnect the above-described elements 110 to 170 and may be a circuit for conveying communications (e.g., a control message and/or data) among the above-described elements.

The processor 120 may include one or more of a central processing unit (CPU), an application processor (AP), or a communication processor (CP). For example, the processor 120 may perform an arithmetic operation or data processing associated with control and/or communication of at least other elements of the electronic device 101.

The memory 130 may include a volatile and/or nonvolatile memory. The memory 130 may store instructions or data associated with at least one other element(s) of the electronic device 101. The memory 130 stores software and/or a program 140. The program 140 includes, for example, a kernel 141, a middleware 143, an application programming interface (API) 145, and/or an application program (or "an application") 147. At least a portion of the kernel 141, the middleware 143, or the API 145 may be called an "operating system (OS)".

For example, the kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform a mediation role such that the API 145 or the application program 147 communicates with the kernel 141 to exchange data.

The middleware 143 may process task requests received from the application program 147 according to a priority. For example, the middleware 143 may assign the priority, which makes it possible to use a system resource (e.g., the bus 110, the processor 120, the memory 130, and the like) of the electronic device 101, to at least one of the application program 147. For example, the middleware 143 may process the one or more task requests according to the priority assigned, which makes it possible to perform scheduling or load balancing on the one or more task requests.

The API 145 may be, for example, an interface through which the application program 147 controls a function provided by the kernel 141 or the middleware 143, and may include, for example, at least one interface or function (e.g., an instruction) for a file control, a window control, image processing, a character control, and the like.

The I/O interface 150 may transmit an instruction or data, input from a user or another external device, to other component(s) of the electronic device 101. Furthermore, the input/output interface 150 may output an instruction or data, received from other element(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various content (e.g., a text, an image, a video, an icon, a symbol, and the like) to a user. The display 160 may include a touch screen and may receive, for example, a touch, gesture, proximity, or hovering input using an electronic pen or a part of a user's body.

For example, the communication interface 170 may establish communication between the electronic device 101 and a first external electronic device 102, a second external electronic device 104, or a server 106. For example, the communication interface 170 may be connected to a network 162 over wireless communication or wired communication to communicate with the second external electronic device 104 or the server 106.

The wireless communication may include at least one of, for example, long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like, as a cellular communication protocol. Furthermore, the wireless communication may include, for example, a local area network 164. The local area network 164 may include, for example, at least one of wireless fidelity (Wi-Fi), near field communication (NFC), global navigation satellite system (GNSS), and the like. The GNSS may include at least one of, for example, global positioning system (GPS), global navigation satellite system (Glonass), Beidou navigation satellite system (Beidou), and European global satellite-based navigation system (Galileo) based on an available region, a bandwidth, and the like. Hereinafter, in the present disclosure, the terms "GPS" and "GNSS" may be interchangeably used. The wired communication may include at least one of, for example, universal serial bus (USB), high definition multimedia interface (HDMI), recommended standard-232 (RS-232), plain old telephone service (POTS), and the like. The network 162 may include at least one of telecommunications networks, for example, a computer network (e.g., LAN or WAN), an Internet, and a telephone network.

Each of the first and second external electronic devices 102 and 104 may be a device of which the type is different from or the same as that of the electronic device 101. The server 106 may include a group of one or more servers. All or a part of operations that the electronic device 101 will perform may be executed by another or the first and second electronic devices 102 and 104 or the server 106. When the electronic device 101 executes any function or service automatically or in response to a request, the electronic device 101 may not perform the function or the service internally, but, alternatively or additionally, it may request at least a portion of a function associated with the electronic device 101 from the first or second external electronic device 102 or 104 or the server 106. The first or second external electronic device 102 or 104 or the server 106 may execute the requested function or additional function and may send the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
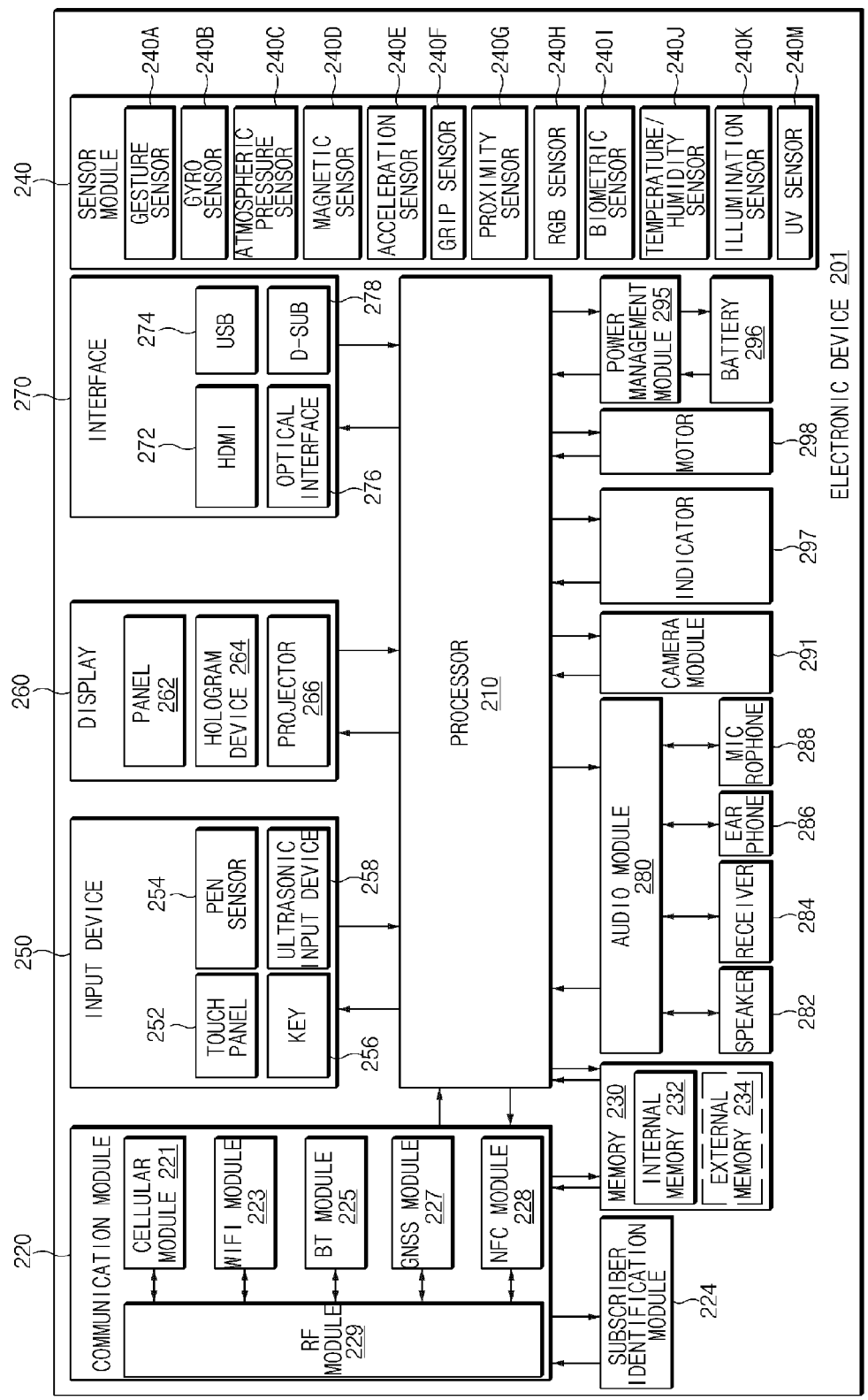
FIG. 2 is a block diagram illustrating an electronic device, according to an embodiment of the present disclosure.

FIG. 2 is a block diagram of an electronic device 201, according to an embodiment of the present disclosure.

The electronic device 201 includes a processor (e.g., an application processor) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system (OS) or an application to control a plurality of hardware or software elements connected to the processor 210 and may process and compute a variety of data. For example, the processor 210 may be implemented with a system on chip (SoC). The processor 210 may further include a graphic processing unit (GPU) and/or an image signal processor. The processor 210 may include at least a part (e.g., a cellular module 221) of elements illustrated in FIG. 2. The processor 210 may load and process an instruction or data, which is received from at least one of other elements (e.g., a nonvolatile memory), and may store a variety of data at a nonvolatile memory.

The communication module 220 may include the cellular module 221, a Wi-Fi module 223, a Bluetooth (BT) module 225, a GNSS module 227 (e.g., a GPS module, a Glonass module, a Beidou module, or a Galileo module), a near field communication (NFC) module 228, and a radio frequency (RF) module 229.

The cellular module 221 may provide, for example, voice communication, video communication, a character service, an Internet service, and the like over a communication network. The cellular module 221 may perform discrimination and authentication of the electronic device 201 within a communication network by using the subscriber identification module (e.g., a SIM card) 224. The cellular module 221 may perform at least a portion of functions that the processor 210 provides. The cellular module 221 may include a communication processor (CP).

Each of the Wi-Fi module 223, the BT module 225, the GNSS module 227, and the NFC module 228 may include a processor for processing data exchanged through a corresponding module, for example. At least a portion (e.g., two or more) of the cellular module 221, the Wi-Fi module 223, the BT module 225, the GNSS module 227, or the NFC module 228 may be included within one integrated circuit (IC) or an IC package.

For example, the RF module 229 may transmit and receive a communication signal (e.g., an RF signal). For example, the RF module 229 may include a transceiver, a power amplifier module (PAM), a frequency filter, a low noise amplifier (LNA), an antenna, and the like. According to an embodiment of the present disclosure, at least one of the cellular module 221, the Wi-Fi module 223, the BT module 225, the GNSS module 227, and the NFC module 228 may transmit and receive an RF signal through a separate RF module.

The subscriber identification module 224 may include, for example, a subscriber identification module and may include unique identify information (e.g., integrated circuit card identifier (ICCID)) or subscriber information (e.g., integrated mobile subscriber identity (IMSI)).

The memory 230 includes, for example, an internal memory 232 or an external memory 234. For example, the internal memory 232 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory)), a hard drive, or a solid state drive (SSD).

The external memory 234 may include a flash drive, for example, compact flash (CF), secure digital (SD), micro secure digital (Micro-SD), mini secure digital (Mini-SD), extreme digital (xD), multimedia card (MMC), a memory stick, and the like. The external memory 234 may be operatively and/or physically connected to the electronic device 201 through various interfaces.

The sensor module 240 may measure, for example, a physical quantity or may detect an operation state of the electronic device 201. The sensor module 240 may convert the measured or detected information to an electric signal. The sensor module 240 may include at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., red, green, blue (RGB) sensor), a biometric sensor 240I, a temperature/humidity sensor 240J, an illuminance sensor 240K, and an UV sensor 240M. The sensor module 240 may include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one or more sensors included therein. The electronic device 201 may further include a processor which is a part of the processor 210 or independent of the processor 210 and is configured to control the sensor module 240. The processor may control the sensor module 240 while the processor 210 remains in a sleep state.

The input device 250 includes, for example, a touch panel 252, a (digital) pen sensor 254, a key 256, or an ultrasonic input unit 258. For example, the touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, and the like. The ultrasonic input device 258 may detect (or sense) an ultrasonic signal, which is generated from an input device, through a microphone 288 and may check data corresponding to the detected ultrasonic signal.

The display 260 includes a panel 262, a hologram device 264, or a projector 266. The panel 262 may be configured to be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. The screen may be arranged in the inside or the outside of the electronic device 201. According to an embodiment of the present disclosure, the display module 260 may further include a control circuit for controlling the panel 262, the hologram device 264, or the projector 266.

The interface 270 includes, for example, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, a SD card/multi-media card (MMC) interface, or an infrared data association (IrDA) standard interface.

The audio module 280 may convert a sound and an electric signal bidirectionally. The audio module 280 may process, for example, sound information that is input or output through a speaker 282, a receiver 284, an earphone 286, or a microphone 288.

The camera module 291 for capturing a still image or a video may include, for example, at least one image sensor (e.g., a front sensor or a rear sensor), a lens, an image signal processor (ISP), or a flash (e.g., an LED or a xenon lamp).

The power management module 295 may manage, for example, power of the electronic device 201. According to an embodiment of the present disclosure, a power management integrated circuit (PMIC), a charger IC, or a battery gauge may be included in the power management module 295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining charge capacity of the battery 296 and a voltage, a current or a temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, and the like. The motor 298 may convert an electrical signal into a mechanical vibration and may generate the following effects: vibration, haptic, and the like. A processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFlo™, and the like.

Each of the above-mentioned elements may be configured with one or more components, and the names of the elements may be changed according to the type of the electronic device. In an embodiment of the present disclosure, the electronic may include at least one of the above-mentioned elements described in the present disclosure, and some elements may be omitted or other additional elements may be added. Furthermore, some of the elements of the electronic device may be combined with each other so as to form one entity, so that the functions of the elements may be performed in the same manner as before the combination.

Figure 3:
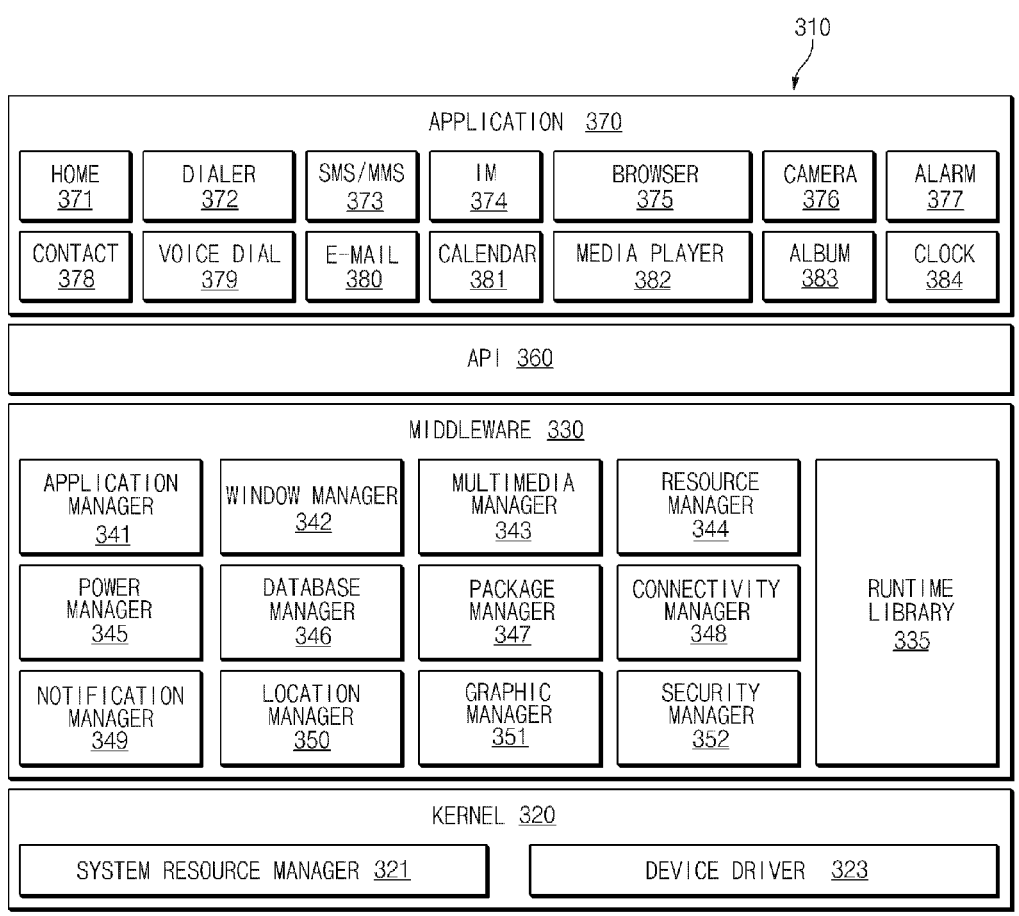
FIG. 3 illustrates a block diagram of a program module, according to an embodiment of the present disclosure.

FIG. 3 is a block diagram of a program module, according to an embodiment of the present disclosure. A program module 310 may include an operating system (OS) to control resources associated with the electronic device 101, and/or diverse applications (e.g., the application program 147) driven on the OS. The OS may be, for example, Android, iOS, Windows, Symbian, Tizen, or Bada.

The program module 310 includes a kernel 320, a middleware 330, an application programming interface (API) 360, and/or an application 370. At least a part of the program module 310 may be preloaded on an electronic device or may be downloadable from the first and second external electronic devices 102 and 104, the server 106, and the like.

The kernel 320 includes, for example, a system resource manager 321 and/or a device driver 323. The system resource manager 321 may perform control, allocation, or retrieval of system resources. According to an embodiment of the present disclosure, the system resource manager 321 may include a process managing unit, a memory managing unit, or a file system managing unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function that the application 370 needs in common, or may provide diverse functions to the application 370 through the API 360 to allow the application 370 to efficiently use limited system resources of the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that is used by a compiler to add a new function through a programming language while the application 370 is being executed. The runtime library 335 may perform input/output management, memory management, or capacities about arithmetic functions.

The application manager 341 may manage, for example, a life cycle of at least one application of the application 370. The window manager 342 may manage a GUI resource which is used in a screen. The multimedia manager 343 may identify a format necessary for playing diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power and may provide power information for an operation of an electronic device. The database manager 346 may generate, search for, or modify database that is to be used in at least one application of the application 370. The package manager 347 may install or update an application that is distributed in the form of package file.

The connectivity manager 348 may manage, for example, wireless connection such as Wi-Fi or Bluetooth. The notification manager 349 may display or notify an event such as arrival message, appointment, or proximity notification in a mode that does not disturb a user. The location manager 350 may manage location information about an electronic device. The graphic manager 351 may manage a graphic effect that is provided to a user, or manage a user interface relevant thereto. The security manager 352 may provide a general security function necessary for system security or user authentication. When the electronic device 101 includes a telephony function, the middleware 330 may further include a telephony manager for managing a voice or video call function of the electronic device.

The middleware 330 may include a middleware module that combines diverse functions of the above-described components. The middleware 330 may provide a module specialized to each OS kind to provide differentiated functions. Additionally, the middleware 330 may dynamically remove a part of the preexisting elements or may add new elements thereto.

The API 360 may be, for example, a set of programming functions and may be provided with a configuration that is variable depending on an OS. For example, in the case where an OS is Android or iOS, it may be permissible to provide one API set per platform. In the case where an OS is Tizen, it may be permissible to provide two or more API sets per platform.

The application 370 includes, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, and a timepiece 384, or for offering health care (e.g., measuring an exercise quantity, blood sugar level, and the like) or environmental information (e.g., atmospheric pressure, humidity, temperature, and the like).

The application 370 may include an information exchanging application to support information exchange between the electronic device 101 and the first and second external electronic devices 102 and 104. The information exchanging application may include, for example, a notification relay application for transmitting specific information to the external electronic device, or a device management application for managing the external electronic device.

For example, the notification relay application may include a function of transmitting notification information, which arise from other applications (e.g., applications for SMS/MMS, e-mail, health care, or environmental information), to the first and second external electronic devices 102 and 104. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) the first and second external electronic devices 102 and 104 that communicates with the electronic device, an application running in the external electronic device, or a service (e.g., a call service, a message service, and the like) provided from the external electronic device.

The application 370 may include an application (e.g., a health care application of a mobile medical device, and the like) that is assigned in accordance with an attribute of the first and second external electronic devices 102 and 104. The application 370 may include an application that is received from the first or second external electronic device 102 or 104, or the server 106. The application 370 may include a preloaded application or a third party application that is downloadable from a server. The element titles of the program module 310 may be modifiable depending on the kinds of operating systems.

At least a part of the program module 310 may be implemented by software, firmware, hardware, or a combination of two or more thereof. At least a portion of the program module 310 may be implemented (e.g., executed), for example, by the processor (e.g., the processor 210). At least a portion of the program module 310 may include, for example, modules, programs, routines, sets of instructions, or processes, and the like for performing one or more functions.

Figure 4A:
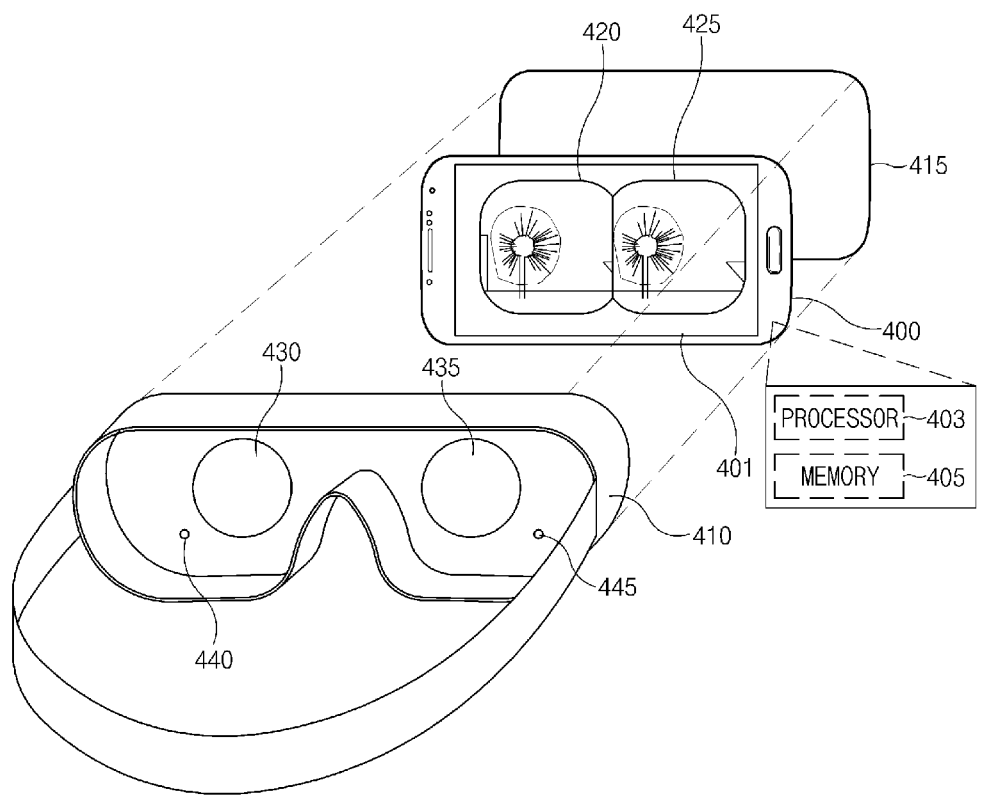
FIG. 4A illustrates an electronic device and an external device detachably attached to the electronic device, according to an embodiment of the present disclosure.

FIG. 4A illustrates an electronic device 400 and an external device 410, according to an embodiment of the present disclosure. Referring to FIG. 4A, the electronic device 400 may be located between the external device 410 and a cover of the external device 410 such that the electronic device 400 is coupled to the external device 410. The electronic device 400 and the external device 410 may be connected with each other through a connector, a communication module, and the like to exchange data with each other.

The electronic device 400 may include a display 401, a processor 403, and a memory 405. A configuration of the electronic device 400 illustrated in FIG. 4A may be an implementation example of the present disclosure and may be changed or modified. For example, the electronic device 400 may further include a user interface for receiving any instruction or information from a user. In this case, the user interface may be generally an input device such as a keyboard, a mouse, and the like, but it may be a graphical user interface (GUI) displayed on a screen of the electronic device 400.

The electronic device 400 and the external device 410 illustrated in FIG. 4A may perform a specific operation in conjunction with each other. According to an embodiment of the present disclosure, the electronic device 400 and the external device 410 may be coupled to each other and may perform the specific operation as a wearable device.

According to an embodiment of the present disclosure, the display 401 may display at least one content. For example, the content may include an image, a video, an application execution screen, and the like. Furthermore, an operation in which the display 401 displays the content may be performed by the processor 403.

According to an embodiment of the present disclosure, a first or a second sensor 440 or 445 may capture an image including an eye or a pupil of the user. For example, the first sensor 440 may capture an image including a left eye or a left pupil of the user, and the second sensor 445 may capture an image including a right eye or a right pupil of the user. The sensor 440 or 445 may be an infrared (IR) sensor.

In FIG. 4A, the external device 410 includes the sensors 440 and 445. However, according to an embodiment of the present disclosure, the electronic device 400 may be a wearable device that includes the display 401, the processor 403, the memory 405, and the sensors 440 and 445.

An operation in which each of the sensors 440 and 445 captures an image may be performed by sending, to the processor 403, a control signal by using a connector or a communication module, such that each of the sensors 440 and 445 captures the image.

The processor 403 may be implemented with, for example, a system on chip (SoC) and may include one or more of a central processing unit (CPU), a graphic processing unit (GPU), an image signal processor, an application processor (AP), and a communication processor (CP). The processor 403 may load an instruction or data, received from at least one of other elements (e.g., the display 401, the first sensor 440, or the second sensor 445), from the memory 405 and may process the loaded instruction or the loaded data. The processor 403 may store various data in the memory 405.

The processor 403 may provide screens 420 and 425 to the user through the display 401. The screen 420 may be a screen to be provided to the left eye of the user, and the screen 425 may be a screen to be provided to the right eye of the user. The user that wears the electronic device 400 and the external device 410 may view the screen 420 through a first lens 430 and may view the screen 425 through a second lens 435. The screen 420 and the screen 425 may be screens corresponding to each other. A left area of the screen 420 may be displayed greater than that of the screen 425, and a right area of the screen 425 may be displayed greater than that of the screen 420. The screen 420 and the screen 425 may be provided to the both eyes of the user, respectively. The user may view three-dimensional (3D) content. A 3D screen provided to the user is illustrated in FIG. 4B.

Figure 4B:
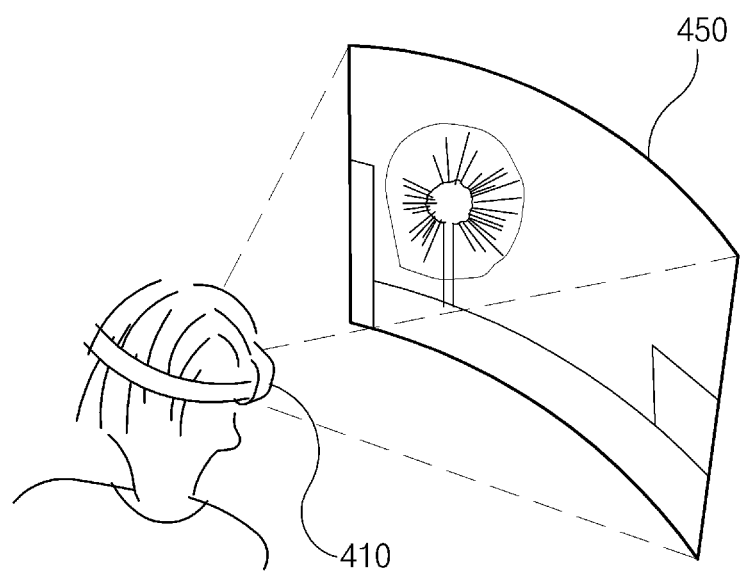
FIG. 4B illustrates a screen provided to a user by the electronic device and the external device illustrated in FIG. 4A, according to an embodiment of the present disclosure.

FIG. 4B illustrates a screen 450 that is provided to a user by the electronic device 400 and the external device 410, according to an embodiment of the present disclosure. The screen 450 may be a screen that is perceived by the user as a virtual screen.

If the user wears the external device 410 tilted to one side, the user may be provided with 3D content that is out of focus, thereby causing a decrease in the viewing quality. Therefore, the electronic device 400 may provide the user with a guide that allows the user to wear the external device 410 correctly. For example, the processor 403 may provide the guide to the user by interpreting the image captured by the sensor 440 or 445. The operation of providing the guide will be described with reference to FIGS. 6 to 11.

According to an embodiment of the present disclosure, in the case where the screen 420 is correctly aligned with the left eye of the user and the screen 425 is correctly aligned with the right eye of the user, the electronic device 400 may provide an optimum 3D content environment. Therefore, the processor 403 may adjust a distance between the screen 420 and the screen 425 based on inter pupillary distance (IPD) that is a distance between the pupils of the eyes of the user. The operation of adjusting the distance will be described with reference to FIG. 12.

Figure 4C:
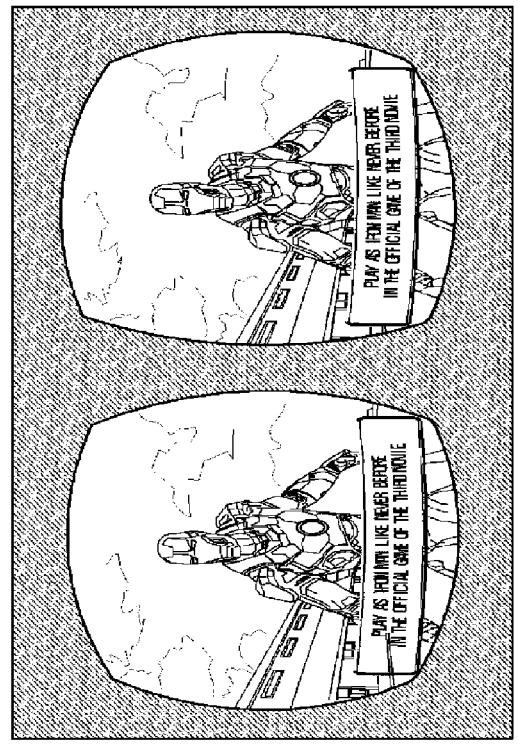
FIG. 4C illustrates a normal mode and a head-mounted (HM) mode (or VR mode) of an external device, according to an embodiment of the present disclosure.
Figure 4C:
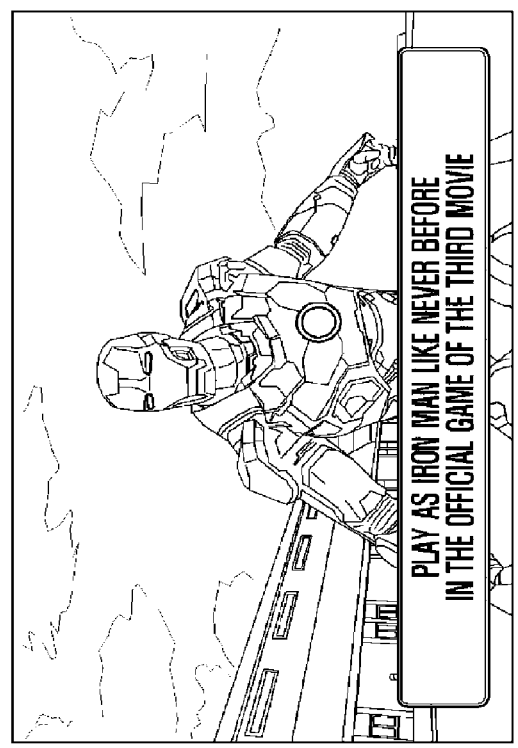

FIG. 4C illustrates a normal mode and a head-mounted (HM) mode (or VR mode) of an external device, according to an embodiment of the present disclosure.

The HM mode (or VR mode) may be a mode that provides at least one of a see-through function, which provides augmented reality (AR), and a see-closed function, which provides virtual reality (VR), to a display. For example, in the case where the electronic device 400 is mounted on the external device 410, the electronic device 400 may switch from the normal mode to the HM mode (or VR mode). In the HM mode (or VR mode), one image may be expressed after being split into two images. According to an embodiment of the present disclosure, in the HM mode (or VR mode), since the image is distorted by a lens included in a main frame, the electronic device 400 may inversely distort a planar image based on the characteristics of the lens to provide an undistorted image to the user.

Figure 4D:
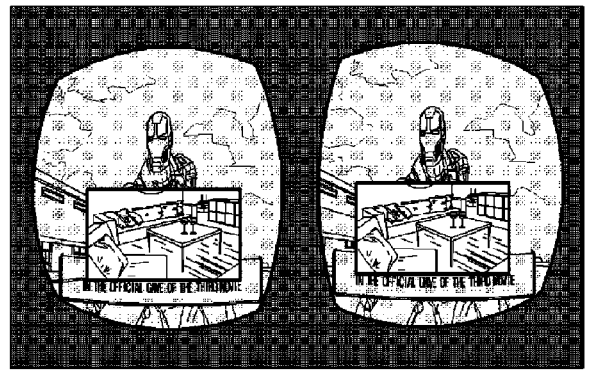
FIG. 4D illustrates a see-through mode that an external device provides by using a rear camera of an electronic device, according to an embodiment of the present disclosure.
Figure 4D:
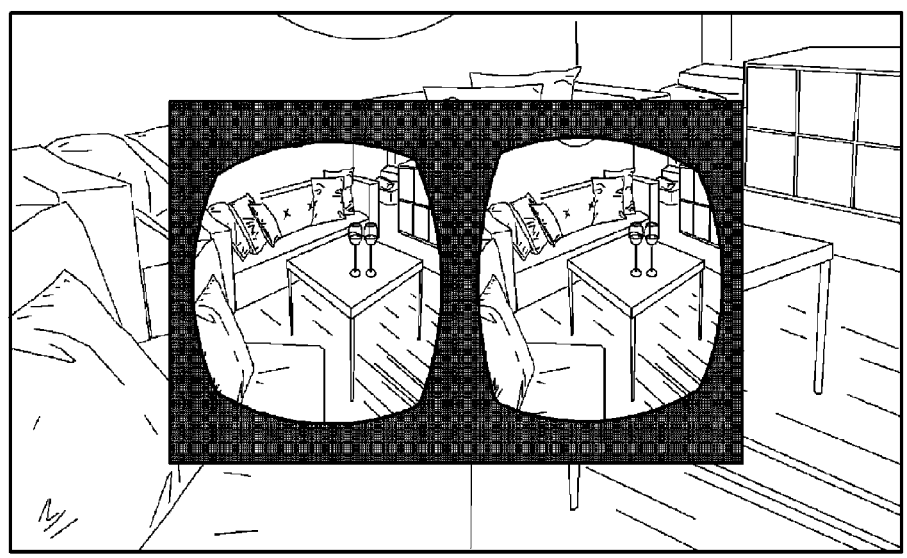

FIG. 4D illustrates a see-through mode that an external device provides by using a rear camera of an electronic device, according to an embodiment of the present disclosure.

Referring to FIG. 4D, the external device 410 may provide the see-through mode by using a rear camera of the electronic device 400.

In an embodiment of the present disclosure, in a see-through mode providing method, a rear camera of a smartphone may be executed by pressing a see-through mode switch button in the VR mode. In this case, the electronic device 400 may display a preview screen, which is captured by the rear camera, on a partial area of an existing VR screen in the form of picture-in-picture (PIP) or may display the preview screen on the entire area of the VR screen after changing the VR screen into a background screen.

The processor 403 may perform user authentication (e.g., iris recognition and the like) by using an image of an eye of the user captured by the sensor 440 or 445. Furthermore, if the authentication result indicates that the user is an authenticated user, the processor 403 may read information about the user stored in the memory 405. The stored information about the user may include IPD information and the like.

The memory 405 may store data, for example, instructions about operations performed in the processor 403. In this case, the data stored in the memory 405 may include data exchanged between internal elements of the electronic device 400 and data exchanged between the electronic device 400 and external elements thereof. For example, the memory 405 may store iris information of the user, IPD information of the user, and the like.

The memory 405 may include an internal memory or an external memory. For example, the internal memory may include at least one of a volatile memory (e.g., a dynamic random access memory (DRAM), a static RAM (SRAM), or a synchronous DRAM (SDRAM)), a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, and the like)), a hard disk drive (HDD), and a solid state drive (SSD).

The external memory may include a flash drive, for example, a compact flash (CF), a secure digital (SD), a micro-SD, a mini-SD, an extreme digital (xD), a multimedia card (MMC), a memory stick, and the like. The external memory may be operatively and/or physically connected with the electronic device 400 through various interfaces.

Figure 4E:
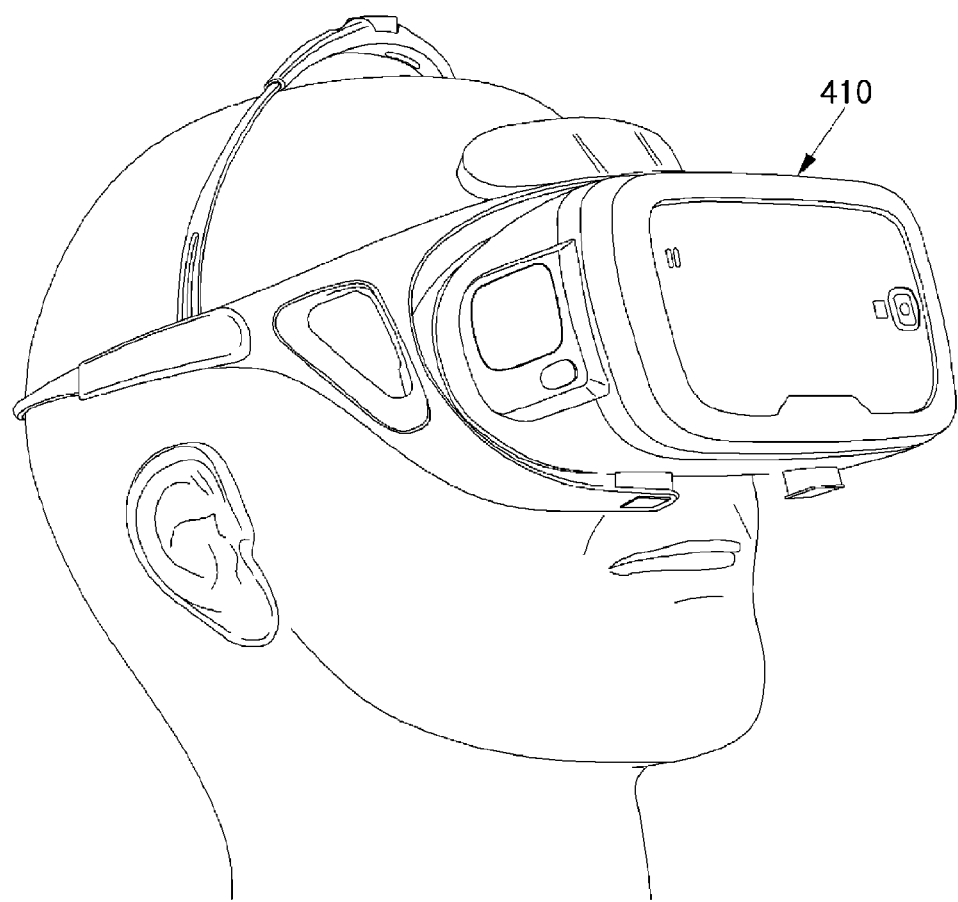
FIG. 4E illustrates a state in which a user wears the external device of FIG. 4A.

FIG. 4E illustrates a state in which a user wears an external device of FIG. 4A.

Figure 5A:
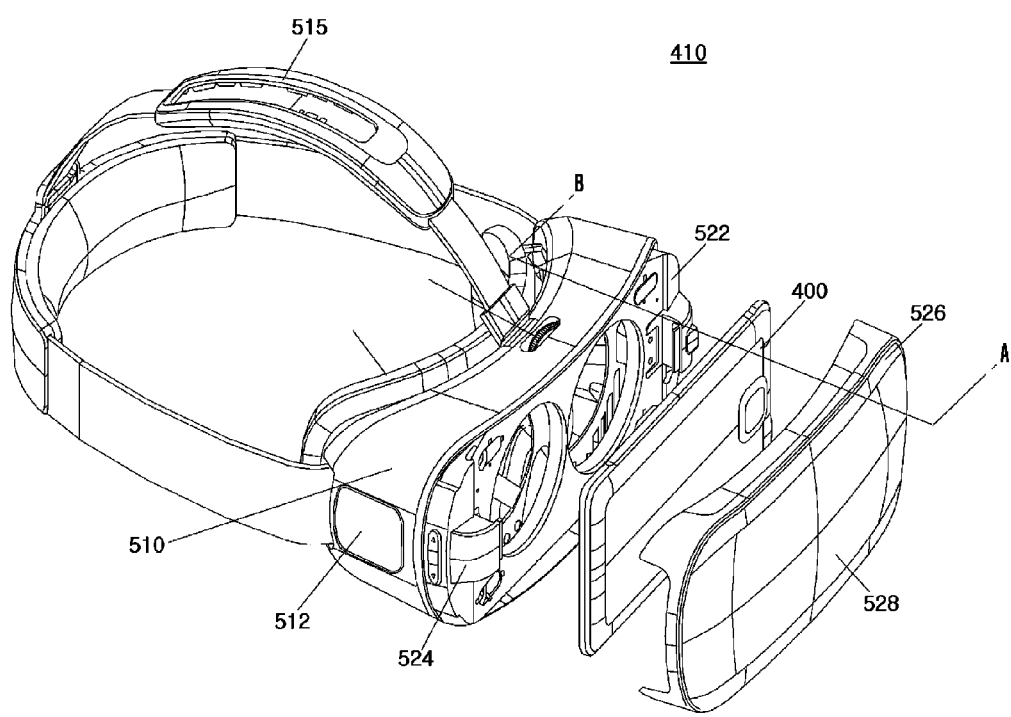
FIG. 5A illustrates a perspective view of a configuration of an external device, according to an embodiment of the present disclosure.

FIG. 5A illustrates a perspective view of a configuration of an external device, according to an embodiment of the present disclosure.

Figure 5B:
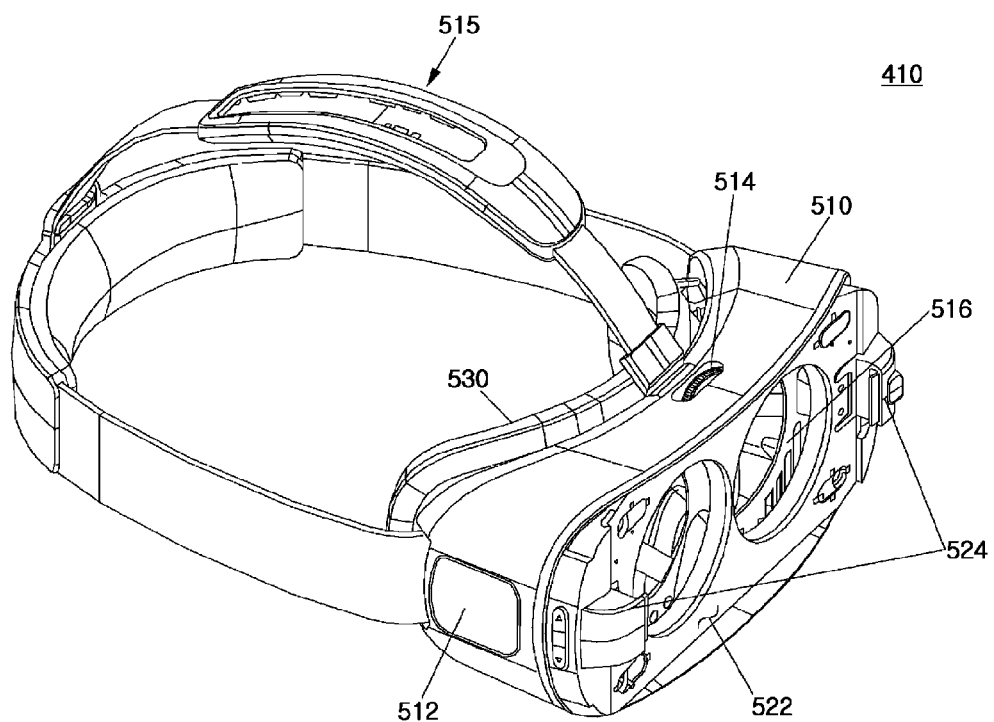
FIG. 5B illustrates a perspective view of a main frame in a state in which the external device of FIG. 5A is not coupled to an electronic device, according to an embodiment of the present disclosure.

FIG. 5B illustrates a perspective view of a main frame in a state where an external device of FIG. 5A is not coupled to an electronic device, according to an embodiment of the present disclosure.

Figure 5C:
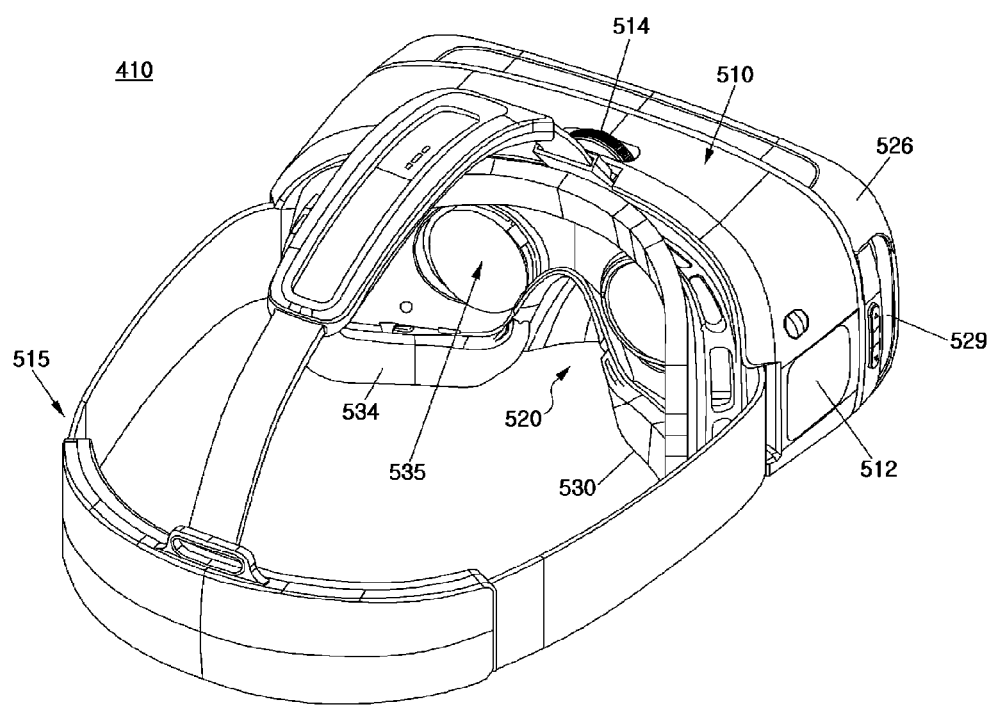
FIG. 5C illustrates a rear perspective view of FIG. 5B in a state where an electronic device and a cover are mounted on an external device, according to an embodiment of the present disclosure.

FIG. 5C illustrates a rear perspective view of FIG. 5B in a state where an electronic device and a cover are mounted on an external device, according to an embodiment of the present disclosure.

Referring to FIGS. 5A to 5C, the external device 410 includes a main frame 510 and a support part 515 (e.g., a goggle band).

The main frame 510 may be worn on at least a portion of the user's face (e.g., a facial side) and may be supported on the user's facial side by various elements.

In an embodiment of the present disclosure, the support part 515 may include a band formed of an elastic material. The main frame 510 may contact a periphery of an eye of the user's face by adjusting a length of the band. A plurality of cushions may be attached to the band to provide comfort during extended wearing.

Additionally or alternatively, the support part 515 may be implemented with eyeglass temples, helmets, straps, and the like.

A rear surface of the main frame 510, which is a facial side contact part 530 that is a part thereof contacting a user's facial side, may have a structure corresponding to the curvature of the user's facial side and may include an elastic body 534.

The elastic body 534 may include a material such as a sponge such that the elastic body 534 provides a comfortable wearing sensation when the facial side contact part 530 contacts the user's facial side. The elastic body 534 may be implemented with one sponge or may include two or more sponges of which compression rates are different from each other. For example, the elastic body 534 may be a sponge that is stacked with three layers (e.g., an upper layer, a middle layer, and a lower layer). In this case, each of the upper and lower layers may be implemented with a sponge of which the compression rate is relatively low, and the middle layer may be implemented with a sponge of which the compression rate is relatively high.

The elastic body 534 may be detachably attached to the main frame 510. An adhesive member may be arranged on one surface of the elastic body 534. The elastic body 534 may be attached to the main frame 510 by the adhesive member. The adhesive member may include velcro, tape, an adhesive, and the like. However, embodiments are not limited thereto. For example, the adhesive member may be implemented with various materials. By adopting the separable elastic body 534, in the case where several users use the one external device 410, each user may select an elastic body that fits his/her well (e.g., in the case where there are a grown-up and a child whose facial sides are different from each other). By adopting the separable elastic body 534, the elastic body 534 may be easily replaced in the case where a surface of the elastic body 534 is contaminated (e.g., cosmetics in the case of a female) or the elastic body 534 is damaged.

Accordingly, the external device 410 according to an embodiment of the present disclosure may be easily worn on the user's facial side. For example, a shape or structure of the main frame 510 may have an appearance that covers the eye of the user and may include a nose recess 520 that is formed such that a nose of the user is located therein.

A lens assembly that includes at least one lens may be inserted at locations, which are portions of the facial side contact part 530, which face the two eyes of the user.

When the user wears the external device 410 according to an embodiment of the present disclosure, one surface of a lens 535 may be exposed to the facial side contact part 530 such that the user views a screen of a display device.

The main frame 510 may be implemented with a material, which is light enough for the user to feel comfortable wearing the main frame 510 and is capable of supporting the electronic device 400, for example, a plastic material.

Further, the external device 410 may further include a material for protecting the external device 410 in the main frame 510.

For strength and appearance, a protection material may include at least one of various materials, for example, glass, plastic (e.g., acrylonitrile butadiene styrene (ABS), polycarbonate), ceramic, metal (e.g., aluminum), and metal alloy (e.g., steel, stainless steel, titanium, or magnesium alloy).

The main frame 510 may include a touch pad 512, a display location adjustment part 514, and a lens fixing part 516. The main frame 510 may further include a front case 522, which includes a space or structure for accommodating the electronic device 400, on a front surface thereof.

The main frame 510 may further include a connector for communicating with the electronic device 400 coupled thereto.

The connector may include a connecting part of the electronic device 400, for example, a USB connector that is connectable to a USB port and may provide the electronic device 400 with a signal of the graphical user interface, which will be described later, through the USB connector.

The front case 522 of the main frame 510 may correspond to the appearance of the electronic device 400.

The front case 522 may include an elastic material or a flexible material, thus accommodating the electronic devices 400 of various sizes.

The external device 410 according to an embodiment of the present disclosure may further include a cover 526 that is coupled to the main frame 510 to allow the electronic device 400 to be more firmly supported by the main frame 510 in a state where the electronic device 400 is mounted on the main frame 510.

The cover 526 may be physically coupled to the main frame 510 by a hook and the like or may be coupled to the main frame 510 by a magnet or an electromagnet.

As such, the cover 526 may prevent the electronic device 400 from disengaging from the main frame 510.

The cover 526 may further include a window 528 on a front surface thereof, and the window 528 may be implemented with various materials and colors.

The window 528 may be formed of a general plastic material such as polycarbonate and acrylic, may be formed of a ceramic material such as glass, sapphire, transparent ceramic, and the like, or may be formed of a metallic material such as aluminum and the like.

The cover 526 may further include one or more openings 529. The opening 529 may emit heat, which is generated at the electronic device 400, to the outside of the cover 526, thereby preventing the performance of a terminal from degrading due to the heat.

A display or the transparent/translucent lens 535 may be integrally fixed to the lens fixing part 516 of the main frame 510 or may be detachably fixed thereto.

A lens assembly may be inserted between the display and the eyes of the user.

A soft material (e.g., sponge, rubber, and the like) may be included on the rear surface of the main frame 510 to prevent the main frame 510 from sticking to a periphery of the eye of the user.

The main frame 510 may include a control device or a user input module that is capable of controlling the electronic device 400.

The control device may include, for example, at least one of the touch pad 512 located on a side surface of the main frame 510, a physical key, a physical button, a touch key, a joystick, and a wheel key.

The touch pad 512 may display a graphical user interface (GUI) that is capable of controlling a function of the electronic device 400. For example, a GUI for setting a sound may adjust a volume of an audio output from the electronic device 400, and a GUI associated with video playback may control a video displayed on the electronic device 400.

The touch pad 512 may receive a touch input or a hovering input.

Since the external device 410 according to an embodiment of the present disclosure is connected with the electronic device 400 by using an interface such as a USB and the like, the external device 410 may send the received touch input to the electronic device 400.

The electronic device 400 may control a function corresponding to the touch input in response to the touch input received from the external device 410. For example, in response to the received touch input, the electronic device 400 may adjust a volume or may control the video playback.

The display location adjustment part 514 may be implemented in the form of a wheel or a dial.

If the user rotates the wheel or the dial implemented as the display location adjustment part 514, the electronic device 400 may be moved such that a distance between the display of the electronic device 400 and the user is adjusted. The user may adjust the location of the electronic device 400 such that the user views a video displayed to be suitable to his/her eyesight or to be optimized for his/her eyesight.

The front case 522 of the main frame 510 may include a connecting part 524 that fixes the electronic device 400 coupled thereto.

Figure 5D:
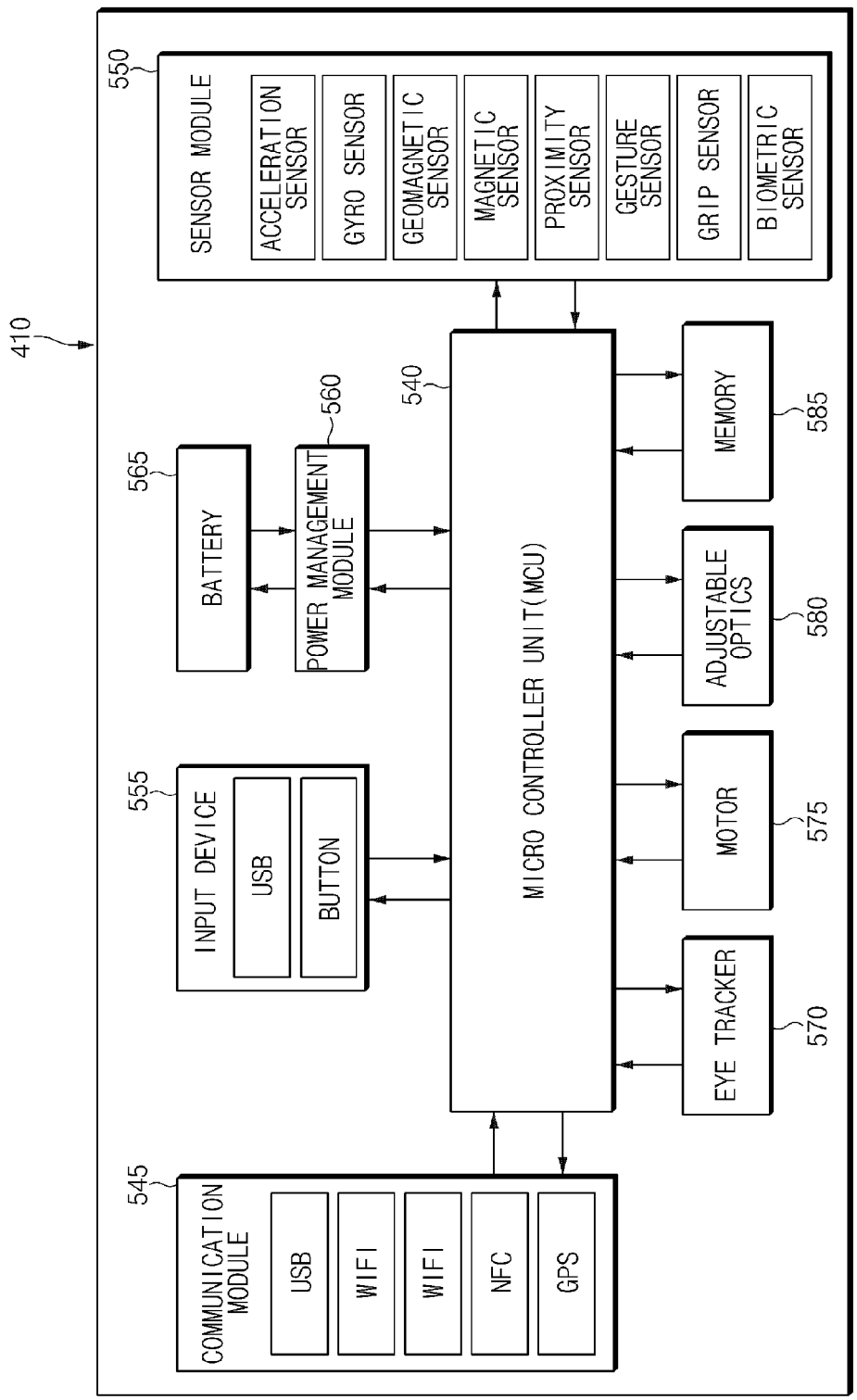
FIG. 5D illustrates a schematic block diagram of a configuration of an external device, according to an embodiment of the present disclosure.

FIG. 5D illustrates a schematic block diagram of a configuration of an external device 410, according to an embodiment of the present disclosure.

Referring to FIG. 5D, the external device 410 according to an embodiment of the present disclosure includes a micro controller unit (MCU) 540, a communication module 545, a sensor module 550, an input device 555, a power management module 560 and a battery 565, an eye tracker 570, a vibrator 575, an adjustable optics or lens assembly 580, and a memory 585.

Some of elements illustrated in FIG. 5D may be included in the main frame 510, and the others may be included in the electronic device 400 (e.g., an attachable and detachable smartphone).

The MCU 540 may include, for example, a processor and may control a plurality of hardware elements connected to the MCU 540 by driving an operating system (OS) or an embedded software program.

The communication module 545 may electrically connect the main frame 510 of the external device 410 with the electronic device 400, for example, a smartphone, over a wired and/or wireless communication and may exchange data.

The communication module 545 may include a USB module, a Wi-Fi module, a BT module, a NFC module, and/or a GPS module.

At least a part (e.g., two or more) of the Wi-Fi module, the BT module, the GPS module, or the NFC module may be included within one integrated circuit (IC) or an IC package.

The sensor module 550 may measure a physical quantity or may detect an operation state of the external device 410. The sensor module 550 may convert the measured or detected information to an electric signal. For example, the sensor module 550 may include at least one of an acceleration sensor, a gyro sensor, a geomagnetic sensor, a magnetic sensor, a proximity sensor, a gesture sensor, a grip sensor, and a biometric sensor.

The external device 410 may detect movement of a head of the user, who wears the external device 410, by using the acceleration sensor, the gyro sensor, and the geomagnetic sensor.

The external device 410 may detect whether the external device 410 is worn, by using the proximity sensor or the grip sensor.

In an embodiment of the present disclosure, at least a part of the sensor module 550 may be included in the electronic device 400.

The sensor module 550 may detect whether the user wears the external device 410 by detecting at least one of variation of infrared (IR), an applied pressure, and capacitance (or dielectric permittivity) according to the wearing of the external device 410 by the user.

The gesture sensor may detect movement of a hand or a finger of the user and may recognize the detected movement as an input to the external device 410.

Additionally or alternatively, the sensor module 550 may include, for example, a biometric sensor, such as an E-nose sensor, an electromyography sensor (EMG) sensor, an electroencephalogram (EEG) sensor, an electrocardiogram (ECG) sensor, an iris sensor, and the like, and may recognize biometric information of the user.

The sensor module 550 may further include a control circuit for controlling one or more sensors included therein.

The input device 555 includes the touch pad 512 and a physical button. The touch pad 512 may detect a touch input based on at least one of a capacitive detecting method, a resistive detecting method, an infrared detecting method, and an ultrasonic detecting method. Also, the touch pad 512 may further include a control circuit. In the case of the capacitive detecting method, a physical contact or proximity recognition may be recognized. The touch pad 512 may further include a tactile layer. In this case, the touch pad 512 may provide a tactile reaction to the user. The button may include, for example, a physical button, an optical key, or a keypad.

For example, the eye tracker 570 may track the user's gaze by using at least one of an electrical oculography (EOG) sensor, coil systems, dual Purkinje systems, bright pupil systems, and dark pupil systems. Moreover, the eye tracker 570 may further include a micro camera for the eye tracking. The adjustable optics 580 may measure the IPD of the user and may adjust a distance of a lens and a location of the display of the electronic device 400 such that the user views an image that is suitable for his/her eyesight.

The memory 585 may include an internal memory or an external memory. For example, the internal memory may include at least one of a volatile memory (e.g., a dynamic random access memory (DRAM), a static RAM (SRAM), or a synchronous DRAM (SDRAM)), and a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, and the like). According to an embodiment of the present disclosure, the internal memory may be a solid state drive (SSD). The external memory may further include a flash drive, for example, a compact flash (CF), a secure digital (SD), a micro secure digital (Micro-SD), a mini secure digital (Mini-SD), an extreme digital (xD), a memory stick, and the like. The external memory may be operatively connected to the external device 410 through various interfaces. The external device 410 may further include a storage device (or storage medium) such as a hard drive.

The memory 585 may store instructions and data generated from the MCU 540, the communication module 545, the sensor module 550, and the input device 555. The memory 585 may include programming modules, such as a kernel, a middleware, an application programming interface (API), or an application.

The kernel may control or manage system resources (e.g., the MCU 540 or the memory 585) that are used to execute operations or functions of other programming modules (e.g., the middleware, the API, or the application) excluding the kernel.

The kernel may provide an interface that allows the middleware, the API, or the application to access discrete elements of the external device 410 so as to control or manage.

The middleware may perform a mediation role such that the API or the application communicates with the kernel to exchange data. The middleware may perform control (e.g., scheduling or load balancing) for work requests using a method of assigning priority, which may use system resources (e.g., the MCU 540 or the memory 585) of the external device 410, to at least one application among the application, in connection with the work requests received from the applications.

The API is an interface that allows the application to control a function provided from the kernel or the middleware. For example, the API may include at least one interface or function (e.g., instruction) for file control, window control, image processing, text control, and the like.

The application may include an SMS/MMS application, an e-mail application, a calendar application, an alarm application, a health care application (e.g., application for measuring an exercise quantity or blood sugar level), an environmental information application (e.g., application for providing information of barometric pressure, humidity, or temperature), and the like. Additionally or alternatively, the application may be an application related to information exchange between the external device 410 and the electronic device 400. For example, the information exchanging application may include a notification relay application for transmitting specific information to the electronic device 400 or a device management application for managing the electronic device 400.

For example, the notification relay application may include a function of transmitting notification information, which arises from other applications (e.g., applications for SMS/MMS, e-mail, health care, or environmental information) of the external device 410, to the electronic device 400. Additionally or alternatively, the notification relay application may receive notification information from the electronic device 400 and provide the notification information to a user. For example, the device management application may manage (e.g., install, delete, or update) at least a part of function (e.g., turn-on/turn-off of an external electronic device itself (or a part of components) or adjustment of brightness (or resolution) of a display) of the electronic device 400 that communicates with the external device 410, an application running in the external electronic device, or a service (e.g., a call service or a message service) provided from the external electronic device.

Figure 6:
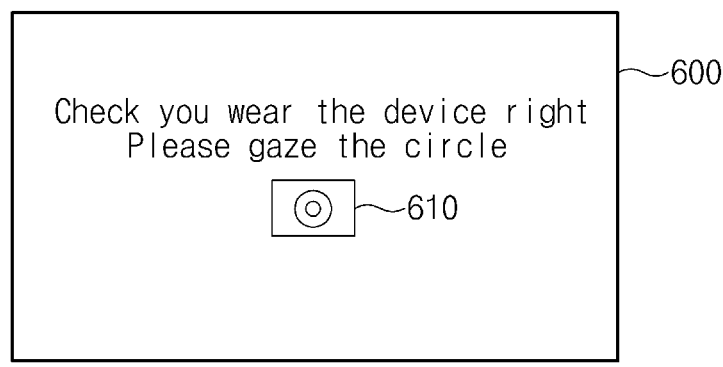
FIG. 6 illustrates a guide screen provided to a user to allow the user to gaze at the front, according to an embodiment of the present disclosure.

FIG. 6 illustrates a guide screen 600 provided to a user to allow the user to gaze at the front of the display, according to an embodiment of the present disclosure. The guide screen 600 may be provided by a user request or may be provided at a preset time. The front of display may mean the center of display The processor 403 may obtain an image including a left eye of the user or an image including a right eye of the user using the sensors 440 and 445 when the user gazes at an object 610 displayed on the guide screen 600.

Hereinafter, an operation of the processor 403 will be described by using an image captured by each of two eyes of the user in FIGS. 7 to 11.

FIGS. 7 to 11 illustrating images of right and left eyes of a user captured by a sensor, according to an embodiment of the present disclosure.

Figure 7:
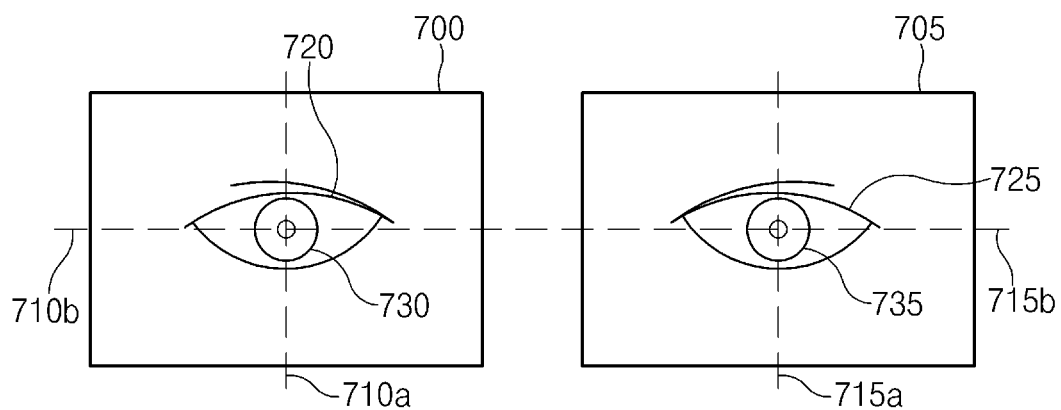
FIG. 7 illustrates images of right and left eyes of a user captured by a sensor, according to an embodiment of the present disclosure.

Referring to FIG. 7, an image 700 illustrated on the left side of FIG. 7 may correspond to a left eye 720 of the user, and an image 705 illustrated on the right side of FIG. 7 may correspond to a right eye 725 of the user. Dotted lines 710a and 715a respectively illustrated in the images 700 and 705 may be reference lines that divide widths of the images 700 and 705 into halves, respectively. Dotted lines 710b and 715b respectively illustrated in the images 700 and 705 may be reference lines that divide heights of the images 700 and 705 into halves, respectively.

The processor 403 may verify, from the images 700 and 705, that two eyes 720 and 725 of the user and two pupils 730 and 735 of the user are located at the centers of the images 700 and 705. For example, the processor 403 may verify that the two eyes 720 and 725 of the user are respectively located at the centers of the images 700 and 705, based on whether the two eyes 720 and 725 of the user are located in a preset range with respect to the reference lines 710a, 710b, 715a, and 715b. The preset range may correspond to an upper bound, a lower bound, a left bound, and a right bound while the reference lines 710a, 710b, 715a, and 715b act as the center lines. Similarly, the processor 403 may verify that the two pupils 730 and 735 of the user are respectively located at the centers of the images 700 and 705, based on whether the two pupils 730 and 735 of the user are located in a preset range with respect to the reference lines 710a, 710b, 715a, and 715b. In this case, the preset range associated with the two eyes of the user may be different from the preset range associated with the two pupils of the user.

The processor 403 may verify that the centers of the two eyes 720 and 725 of the user are respectively located at the centers of the images 700 and 705, based on whether the centers of the two eyes 720 and 725 of the user are located at a preset distance from the centers of the images 700 and 705. Similarly, the processor 403 may verify that the centers of the two pupils 730 and 735 of the user are respectively located at the centers of the images 700 and 705, based on whether the centers of the two pupils 730 and 735 of the user are located at a preset distance from the centers of the images 700 and 705. In this case, the distance preset associated with the two eyes of the user may be different from the distance preset associated with the two pupils of the user.

As such, the processor 403 may determine that the user wears the external device 410 correctly.

The reference lines 710a, 710b, 715a, and 715b are illustrated for descriptive convenience. The reference lines 710a, 710b, 715a, and 715b may not be displayed on the images 700 and 705 obtained by capturing the two eyes of the real user. The reference lines 710a, 710b, 715a, and 715b may be virtual lines for determining the above-described items.

Figure 8:
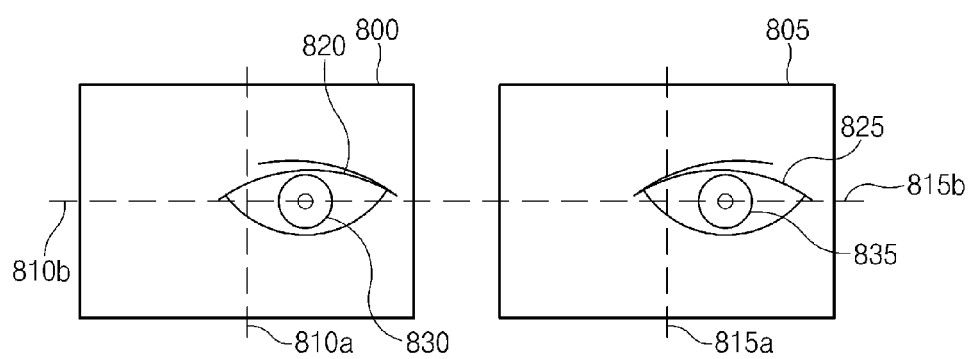
FIG. 8 illustrates images of right and left eyes of a user captured by a sensor, according to another embodiment of the present disclosure.

FIG. 8 illustrates images of right and left eyes of a user captured by a sensor, according to another embodiment of the present disclosure.

An image 800 illustrated on the left side of FIG. 8 may correspond to a left eye 820 of the user and an image 805 illustrated on the right side may correspond to a right eye 825 of the user. Dotted lines 810a, 810b, 815a and 815 respectively illustrated in the images 800 and 805 may be reference lines that divide widths and heights of the two images 800 and 805 into halves, respectively.

Referring to FIG. 8, unlike FIG. 7, the two eyes 820 and 825 and two pupils 830 and 835 of the user are shifted to the right side from the centers of the images 800 and 805.

The processor 403 may determine that the two eyes 820 and 825 of the user deviate to the right side from the preset ranges, referenced to the longitudinal reference lines 810a and 815a. The processor 403 may determine that the two pupils 830 and 835 of the user deviate to the right side from the preset ranges, referenced to the longitudinal reference lines 810a and 815a. As such, the processor 403 may verify that the two eyes 820 and 825 and the two pupils 830 and 835 of the user deviate to the right side from the centers of the images 800 and 805. Therefore, the processor 403 may determine that the user does not wear the external device 410 correctly, thus providing a guide to the user. The guide may guide the user to wear the external device 410 after shifting the external device 410 in a left direction.

Figure 9:
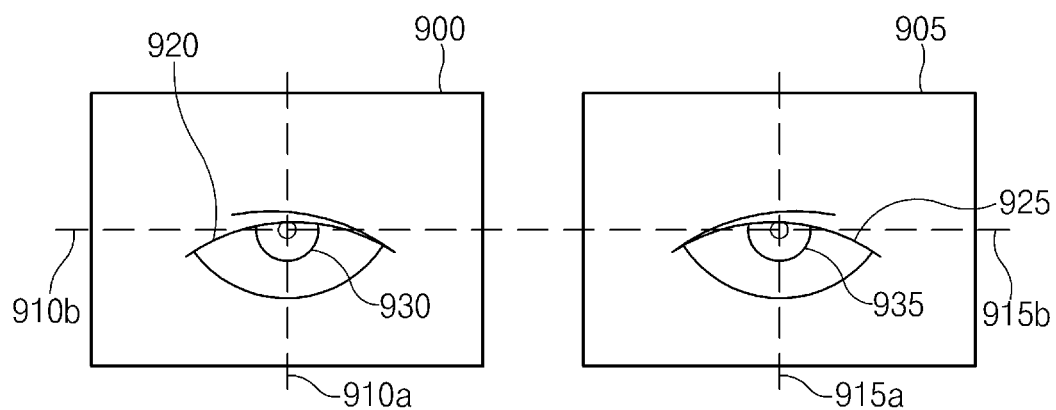
FIG. 9 illustrates images of right and left eyes of a user captured by a sensor, according to another embodiment of the present disclosure.

FIG. 9 illustrates images of right and left eyes of a user captured by a sensor, according to another embodiment of the present disclosure.

An image 900 illustrated on the left side of FIG. 9 may correspond to a left eye 920 of the user and an image 905 illustrated on the right side may correspond to a right eye 925 of the user. Dotted lines 910a and 915a respectively illustrated in the images 900 and 905 may be reference lines that divide widths of the images 900 and 905 into halves, respectively. Dotted lines 910b and 915b respectively illustrated in the images 900 and 905 may be reference lines that divide heights of the images 900 and 905 into halves, respectively.

Referring to FIG. 9, two pupils 930 and 935 of the user are located at the centers of the images 900 and 905. However, the two eyes 920 and 925 of the user are not located at the centers of the two images 900 and 905, but the two eyes 920 and 925 of the user are located at lower portions of the images 900 and 905 with respect to the horizontal reference lines 910b and 915b. That is, the user may be gazing at the guide screen 600 while raising his/her eyes. This may mean that the user wears the external device 410 incorrectly.

If the processor 403 determines a wearing state of the external device 410 by the user based on only the locations of the two pupils 930 and 935 of the user, in FIG. 9, the processor 403 may determine that the user wears the external device 410 correctly. Therefore, to prevent such misjudgment, the processor 403 may determine the wearing state of the external device 410 by the user by considering the locations of the two eyes 920 and 925 of the user, as well as the locations of the two pupils 930 and 935 of the user. For example, even though the two pupils 930 and 935 of the user are located at the centers of the images 900 and 905, if the two eyes 920 and 925 of the user are not located at the centers of the images 900 and 905, the processor 403 may determine that the user is incorrectly wearing the external device 410. In this case, the processor 403 may generate a guide screen and may provide the user with the guide screen such that the user moves the external device 410 downward while wearing the external device 410 and does not raise his/her eyes.

The processor 403 may determine the locations of the two pupils 930 and 935 of the user in the two eyes 920 and 925 of the user and may determine whether the user wears the external device 410 correctly, based on the determined locations.

Figure 10:
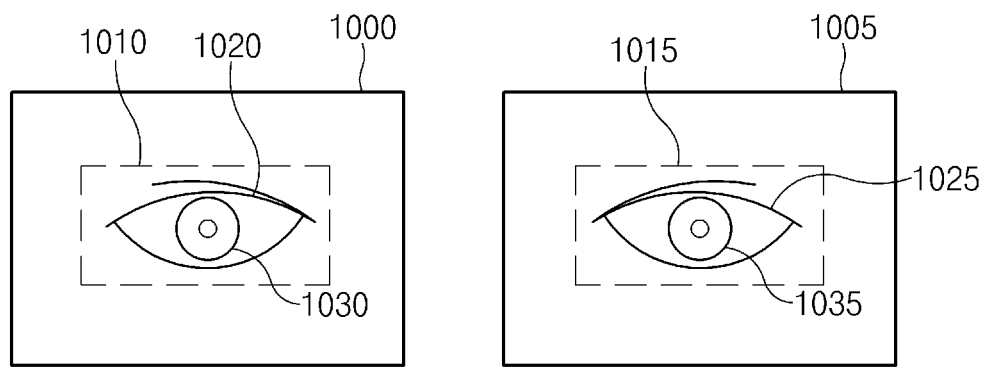
FIG. 10 illustrates images of right and left eyes of a user captured by a sensor, according to another embodiment of the present disclosure.

FIG. 10 illustrates images of right and left eyes of a user captured by a sensor, according to another embodiment of the present disclosure.

An image 1000 illustrated on the left side of FIG. 10 may correspond to a left eye 1020 of the user and an image 1005 illustrated on the right side may correspond to a right eye 1025 of the user. Dotted areas 1010 and 1015 respectively illustrated in the images 1000 and 1005 may be areas that are preset in correspondence to sizes of the images 1000 and 1005, respectively.

The areas 1010 and 1015 of FIG. 10 may be used to replace the reference lines 710a, 710b, 715a, 715b, 810a, 810b, 815a, 815b, 910a, 910b, 915a, and 915b of FIGS. 7 to 9. For example, the processor 403 may determine whether the user wears the external device 410 correctly, based on whether the two eyes 1020 and 1025 of the user are included in the areas 1010 and 1015, respectively. However, even in this case, both the locations of the two eyes of the user and the locations of the two pupils of the user may be considered as described with reference to FIG. 9.

The two areas 1010 and 1015 corresponding to the two eyes of the user are illustrated in FIG. 10. However, areas corresponding to the two pupils of the user may be further included in the areas 1010 and 1015. The areas 1010 and 1015 are illustrated for descriptive convenience. The areas 1010 and 1015 may not be actually expressed in the images 1000 and 1005 obtained by capturing the two eyes of the user. The areas 1010 and 1015 may be areas that the processor 403 virtually creates to determine the above-described items.

Figure 11:
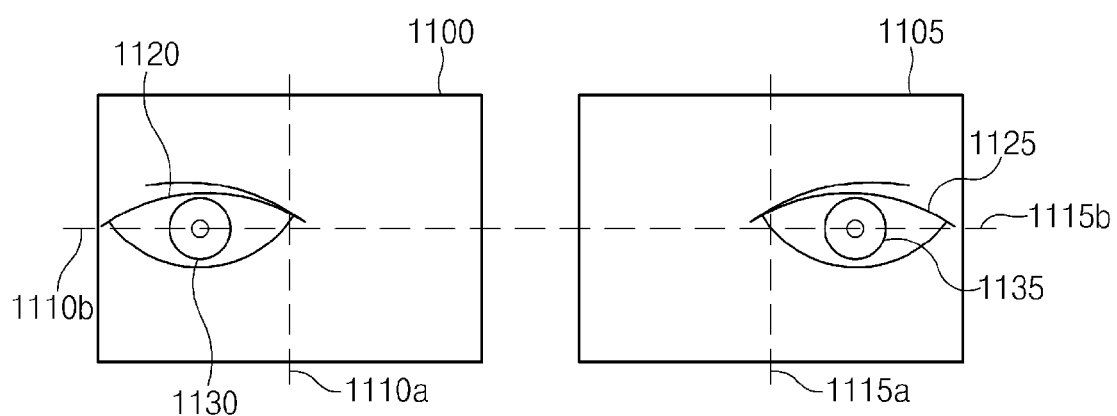
FIG. 11 illustrates images of right and left eyes of a user captured by a sensor, according to another embodiment of the present disclosure.

FIG. 11 illustrates images of right and left eyes of a user captured by a sensor, according to another embodiment of the present disclosure.

An image 1100 illustrated on the left side of FIG. 11 may correspond to a left eye 1120 of the user and an image 1105 illustrated on the right side may correspond to a right eye 1125 of the user. Dotted lines 1110a and 1115a respectively illustrated in the images 1100 and 1105 may be reference lines that divide widths of the images 1100 and 1105 into halves, respectively. Dotted lines 1110b and 1115b respectively illustrated in the images 1100 and 1105 may be reference lines that divide heights of the images 1100 and 1105 into halves, respectively.

Referring to FIG. 11, unlike FIG. 9, it is understood that the left eye 1120 of the user is located on the left side of the image 1100 and the right eye 1125 of the user is located on the right side of the image 1105.

As described with reference to FIGS. 6 to 11, the processor 403 may determine whether the user wears the external device 410 correctly, based on the locations of the two eyes 1120 and 1125 of the user and the locations of two pupils 1130 and 1135 of the user. However, if the processor 403 determines a wearing state of the external device 410 by the user, based only on whether the two eyes 1120 and 1125 and the two pupils 1130 and 1135 of the user are located at the centers of the images 1100 and 1105, in FIG. 11, the processor 403 may determine that the user incorrectly wears the external device 410.

In FIG. 11, it may be understood that the eyes of the user are not located respectively at the centers of the images 1100 and 1105 because the IPD is larger even though the user wears the external device 410 correctly. Therefore, in the case where the locations of the two eyes 1120 and 1125 of the user are not located at the centers of the images 1100 and 1105, the processor 403 may further determine whether the two eyes 1120 and 1125 are shifted in the same direction or in different directions. In this case, even though the IPD is smaller, the processor 403 may not misjudge whether the user wears the external device 410 correctly.

The processor 403 may adjust the distance between the screens 420 and 425 to be provided to the user, which will be more fully described with reference to FIG. 12.

Figures 12A, 12B:
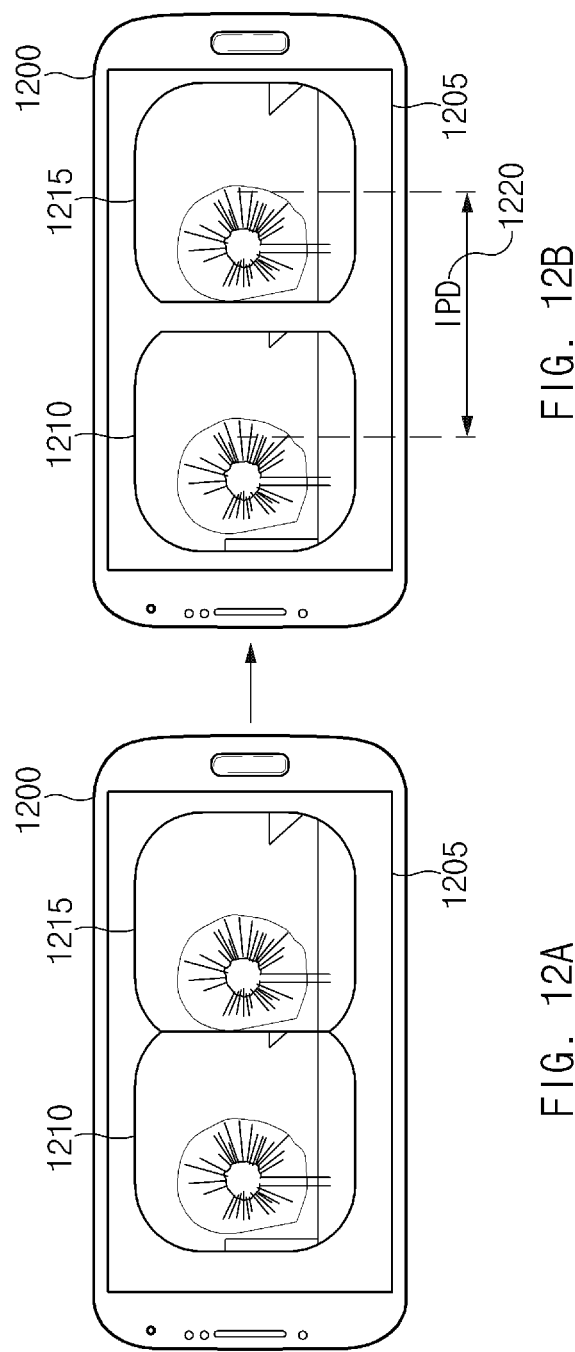
FIG. 12B illustrates an operation of adjusting a distance between corresponding screens which an electronic device provides to a display at the same time, according to another embodiment of the present disclosure.

FIG. 12A illustrates an operation of adjusting a distance between corresponding screens which an electronic device provides to a display at the same time, according to an embodiment of the present disclosure;

FIG. 12B illustrates an operation of adjusting a distance between corresponding screens which an electronic device provides to a display at the same time, according to another embodiment of the present disclosure.

FIGS. 12A and 12B illustrate an operation of adjusting a distance between corresponding screens which an electronic device 1200 provides to a display at the same time, according to an embodiment of the present disclosure. FIG. 12A may be a drawing illustrating a default distance between screens 1210 and 1215, and FIG. 12B may be a drawing illustrating an operation of changing a distance between the screens 1210 and 1215 based on a distance between the two pupils of a user.

The electronic device 1200 may provide the screens 1210 and 1215, which correspond to each other, through a display 1205. However, how the user is immersed in a screen (e.g., the screen 450 of FIG. 4B), which the user is going to view, may change according to the distance between the screens 1210 and 1215. For example, if the distance between a center of the displayed screen 1210 and a center of the displayed screen 1215 becomes the same as the IPD, the user may be more immersed in a screen, and thus the user may not feel dizziness.

Therefore, the electronic device 1200 may measure the distance between the two pupils of the user and may adjust the distance between the two screens 1210 and 1215 to be suitable for the measured distance as shown in FIG. 12B. An operation in which an electronic device measures a distance between two pupils of a user will be described with reference to FIGS. 13 and 14.

Figure 13:
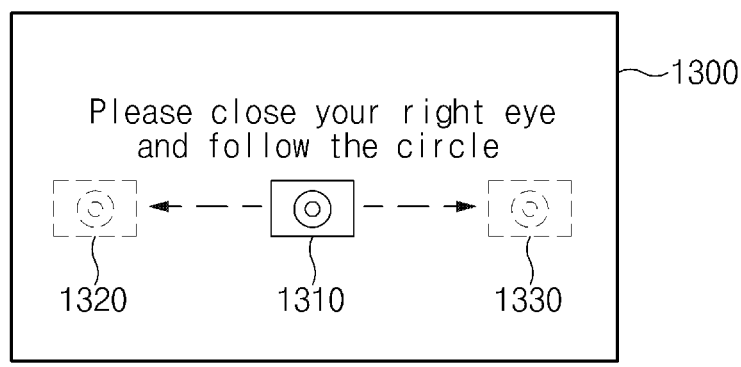
FIG. 13 illustrates a guide screen provided to a user to allow the user to track content provided on a display with his/her eye, according to an embodiment of the present disclosure.

FIG. 13 illustrates a guide screen 1300 provided to a user to allow the user to track content provided on a display with his/her eye, according to an embodiment of the present disclosure.

An object 1310 displayed on the guide screen 1300 may move in one direction between a location 1320 and a location 1330. For example, the object 1310 may move to the location 1330 after moving to the location 1320 and may return to an original location. This operation may be repeated by the preset number of times.

The guide screen 1300 may allow the user to track movement of the object 1310 with one eye. A pupil of the user may move with the object 1310 in the eye of the user so as to correspond to the movement of the object 1310.

The electronic device 1200 may capture the pupil of the user that moves along the object 1310 and may select an image, in which the moving pupil of the user gazes at the front, from among the captured images. The electronic device 1200 may store a location of the object 1310 corresponding to the selected image.

The above-described operation may be performed on each of the left and right pupils of the user. As such, the electronic device 1200 may obtain a location of the object 1310 when the left pupil of the user gazes at the front and a location of the object 1310 when the right pupil of the user gazes at the front.

The guide screen 1300 may be displayed on the display 1205 of the electronic device 1200 as a first screen (e.g., the screen 1210 of FIGS. 12A and 12B) corresponding to a left eye of the user and a second screen (e.g., the screen 1215 of FIGS. 12A and 12B) corresponding to a right eye of the user. The location of the object 1310 obtained with respect to the left eye of the user may be a location of the object 1310 displayed on the first screen, and the location of the object 1310 obtained with respect to the right eye of the user may be a location of the object 1310 displayed on the second screen.

The electronic device 1200 may adjust a distance between the first screen and the second screen based on the location of the object 1310 displayed on the first screen and the location of the object 1310 displayed on the second screen. For example, the electronic device 1200 may adjust the first screen such that the location of the object 1310 displayed on the first screen is located at a center of the first screen. Furthermore, the electronic device 1200 may adjust the second screen such that the location of the object 1310 displayed on the second screen is located at a center of the second screen.

The electronic device 1200 may determine the distance between the location of the object 1310 displayed on the first screen and the location of the object 1310 displayed on the second screen and may adjust the location of one of the first screen and the second screen to be suitable for the determined distance.

Figure 14:
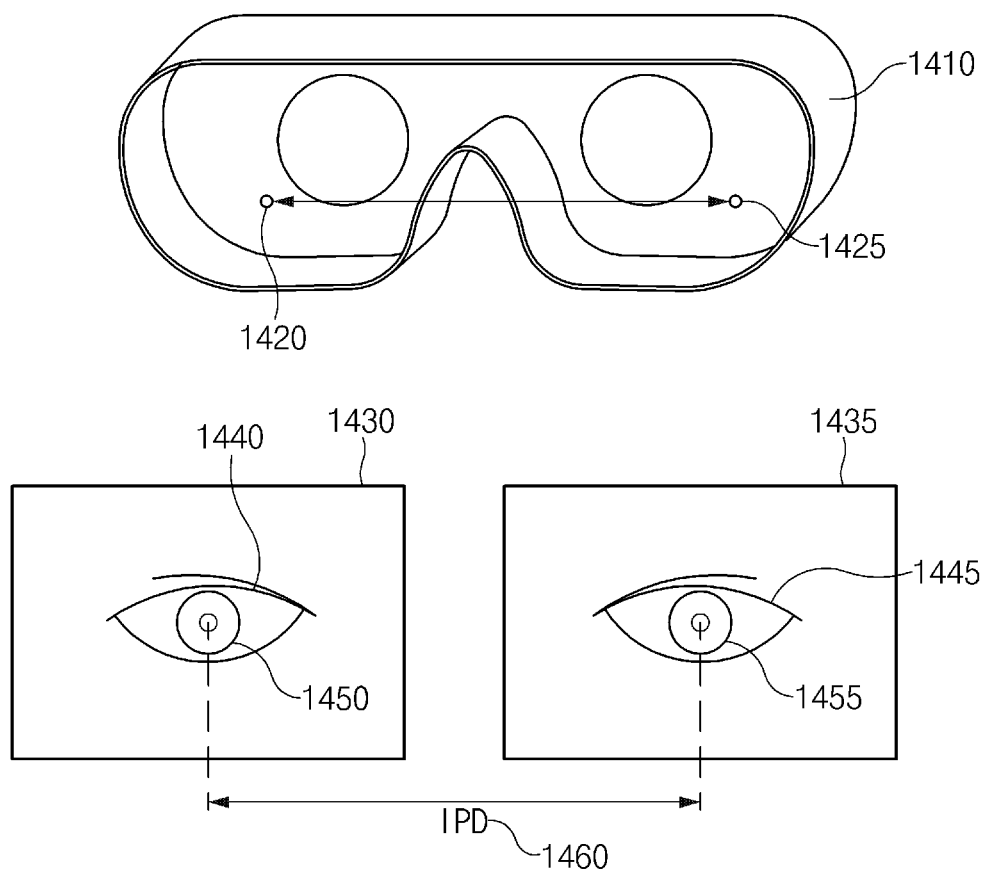
FIG. 14 illustrates an operation in which the electronic device determines a distance between two eyes of a user based on a location of each of a left sensor and a right sensor, according to an embodiment of the present disclosure.

FIG. 14 illustrates an operation in which the electronic device 1200 determines a distance between two eyes of a user based on a location of each of a left sensor 1420 and a right sensor 1425 of the external device 1410, according to an embodiment of the present disclosure.

A left eye 1440 and a left pupil 1450 of the user are displayed on an image 1430 captured by the left sensor 1420, and a right eye 1445 and a right pupil 1455 of the user are displayed on an image 1435 captured by the right sensor 1425.

A distance between the left sensor 1420 and the right sensor 1425 may be stored in the memory of the electronic device 1200. Furthermore, the memory of the electronic device 1200 may store an actual location of each area of each image captured through the left sensor 1420 and the right sensor 1425. Therefore, in this case, the electronic device 1200 may obtain actual IPD from a location of the left pupil 1450 of the image 1430 and a location of the right pupil 1455 of the image 1435.

Figure 15:
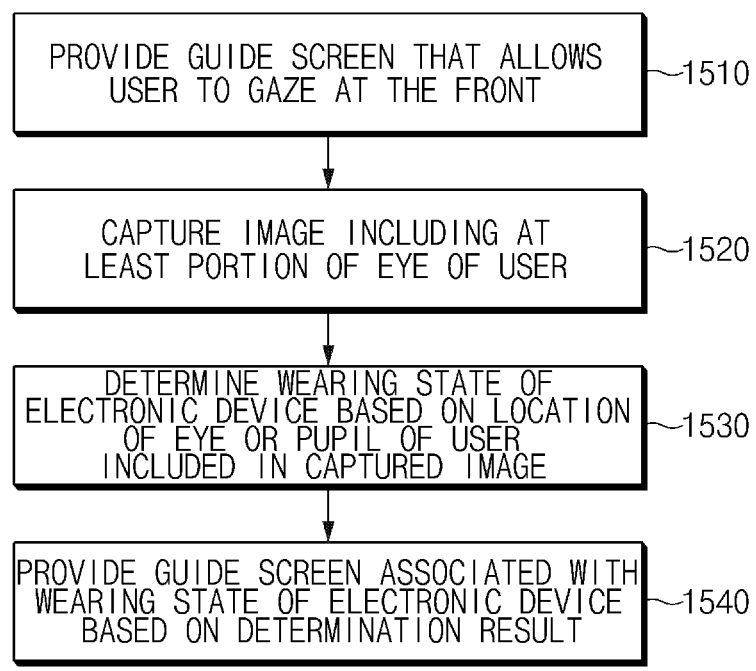
FIG. 15 is a flowchart illustrating a method in which an electronic device determines a user wearing state of an external device to provide a guide, according to an embodiment of the present disclosure.

FIG. 15 is a flowchart illustrating a method in which an electronic device determines a user wearing state of an external device to provide a guide, according to an embodiment of the present disclosure.

The method illustrated in FIG. 15, in which an electronic device determines a user wearing state of an external device to provide a guide, may be performed by the electronic device 400 or 1200 described with reference to FIGS. 1 to 14. Therefore, even though omitted below, the method, in which the electronic device 400 or 1200 described with reference to FIGS. 1 to 14 determines the user wearing state of the external device and provides the guide based on the determination result, may be applied to FIG. 15.

In operation 1510, the electronic device provides a guide screen that allows the user to gaze at the front.

In operation 1520, the electronic device captures an image, in which at least a portion of an eye of the user is included. Operation 1520 may be performed while operation 1510 is performed.

In operation 1530, the electronic device determines the wearing state of the external device based on a location of the eye or a pupil of the user included in the image captured in operation 1520.

In operation 1540, the electronic device provides the guide screen associated with the user wearing state of the external device, based on the determination result of operation 1530.

Figure 16:
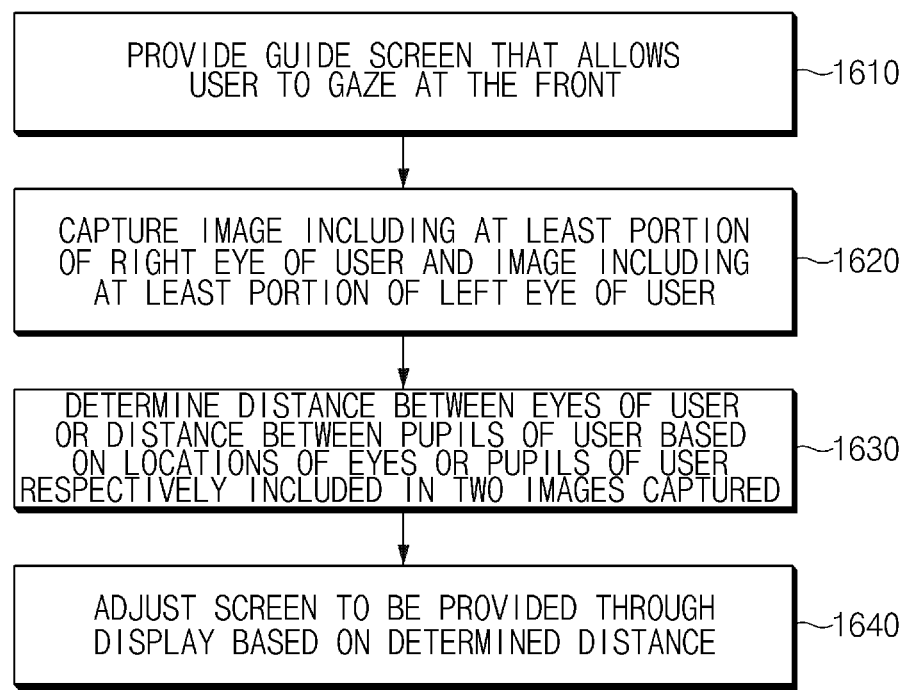
FIG. 16 is a flowchart illustrating a method in which an electronic device determines a distance between eyes of a user to adjust a screen to be provided to a display, according to an embodiment of the present disclosure.

FIG. 16 is a flowchart illustrating a method in which an electronic device determines a distance between eyes of a user to adjust a screen to be provided to a display, according to an embodiment of the present disclosure.

The method illustrated in FIG. 16, in which an electronic device determines a distance between eyes of the user to adjust a screen to be provided to a display, may be performed by the electronic device 400 or 1200 described with reference to FIGS. 1 to 14. Therefore, even though omitted below, the method, in which the electronic device 400 or 1200 described with reference to FIGS. 1 to 14 determines the distance between the eyes of the user to adjust the screen to be provided to the display, may be applied to FIG. 16.

In operation 1610, the electronic device provides a guide screen that guides the user to gaze at the front.

In operation 1620, the electronic device captures an image, in which at least a portion of the right eye of the user is included, and an image, in which at least a portion of the left eye of the user is included. Operation 1620 may be performed while operation 1610 is performed.

In operation 1630, the electronic device determines a distance between two eyes of the user or a distance between two pupils of the user based on locations of the eyes or the pupils of the user respectively included in two images captured in operation 1620.

In operation 1640, the electronic device adjusts a distance between a first screen and a second screen, which correspond to each other and are to be provided to the display, based on the distance determined in operation 1630.

Figure 17:
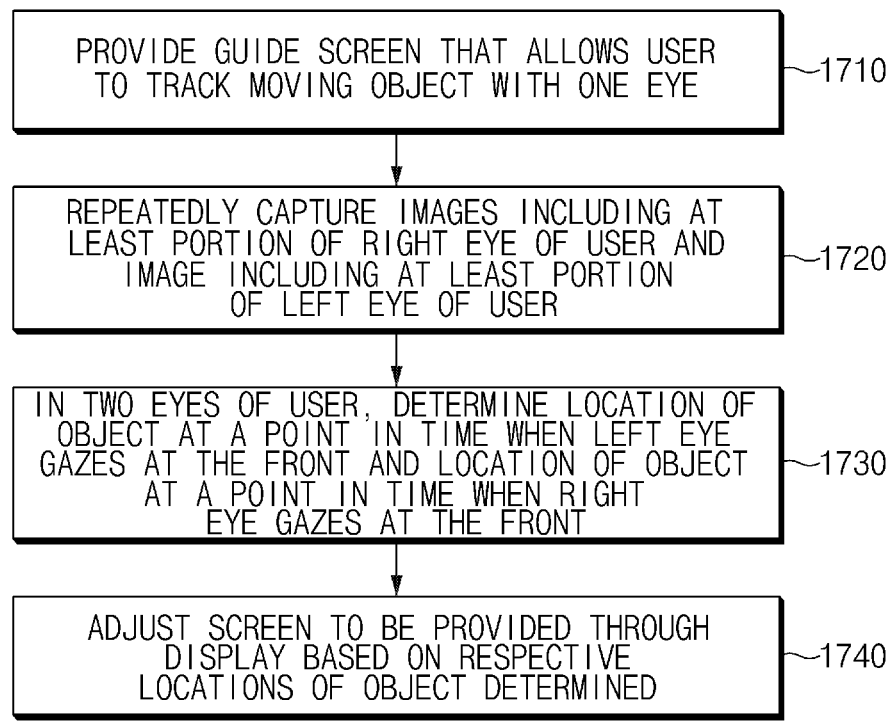
FIG. 17 is a flowchart illustrating a method in which an electronic device determines a distance between eyes of a user to adjust a screen to be provided to a display, according an embodiment of the present disclosure.

FIG. 17 is a flowchart illustrating a method in which an electronic device determines a distance between eyes of a user to adjust a screen to be provided to a display, according to an embodiment of the present disclosure.

The method illustrated in FIG. 17, in which an electronic device determines a distance between the eyes of the user to adjust a screen to be provided to a display, may be performed by the electronic device 400 or 1200 described with reference to FIGS. 1 to 14. Therefore, even though omitted below, the method, in which the electronic device 400 or 1200 described with reference to FIGS. 1 to 14 determines the distance between the eyes of the user to adjust the screen to be provided to the display, may be applied to FIG. 17.

In operation 1710, the electronic device provides a guide screen that allows the user to track a moving object with one eye.

In operation 1720, the electronic device repeatedly captures an image, in which at least a portion of the right eye of the user is included, and an image, in which at least a portion of the left eye of the user is included. Operation 1720 may be performed while operation 1710 is performed.

In operation 1730, in the two eyes of the user, the electronic device may determine a location of the object at a point in time when the left eye gazes at the front and a location of the object at a point in time when the right eye gazes at the front.

In operation 1740, the electronic device may adjust a distance between a first screen and a second screen, which correspond to each other and are to be provided to a display, based on the respective locations of the object determined in operation 1730.

A head-mounted device mountable on a head of a user may include a camera, a first mechanism including a first emitting part, a first reflecting part, and a first sensor, a second mechanism including a second emitting part, a second reflecting part, and a second sensor, a processor electrically connected with the camera, the first mechanism, and the second mechanism, and a memory electrically connected with the processor. The first mechanism may be arranged to correspond to one eye of the user and the second mechanism may be arranged to correspond to the other eye of the user.

The memory includes instructions, which, when executed, cause the processor to obtain a first image based on the result of detecting, through the first sensor, a first reflected light that is obtained by reflecting a first light emitted from the first light-emitting part by the first reflecting part, and to obtain a second image based on the result of detecting, through the second sensor, a second reflected light that is obtained by reflecting a second light emitted from the second emitting part by the second reflecting part. The first reflecting part and the second reflecting part may be implemented in the head-mounted device. However, the first reflecting part and the second reflecting part may be a structure of a location where the user is present.

The head-mounted device may include instructions, which, when executed by the processor cause the head-mounted device to obtain at least one image by using the first image and the second image, and to correct the at least one image by aligning the first image and the second image based on a location of an eye of the user obtained through the camera. The image may be a two-dimensional planar image or may be a stereoscopic image such as a hologram and the like.

The correction of the at least one image may be the same as or correspond to the methods described with reference to FIGS. 1 to 17. For example, to obtain the first image and the second image, the processor may provide the user with a guide screen that allows the user to gaze at the front. Furthermore, the first image and the second image may not be images which include at least a portion of the eye of the user, but the first image and the second image may be images of specific patterns projected on the first reflecting part and the second reflecting part by the first light and the second light.

An electronic device mountable on a head of a user includes a display, a sensor configured to capture an image, a processor electrically connected with the display and the sensor, and a memory electrically connected with the processor, wherein the memory includes instructions, which, when executed, cause the processor to provide a guide screen that allows the user to gaze at a front to the display, to capture an image, in which at least a portion of an eye of the user is included, using the sensor, and to determine a wearing state of the electronic device based on a location of the eye or a pupil of the user displayed in the captured image.

The memory may further include instructions, which, when executed, cause the processor to generate a guide screen associated with the wearing state of the electronic device based on the determination result and to provide the generated guide screen to the display.

The sensor may include a first sensor that captures an image of a right eye of the user and a second sensor that captures an image of a left eye of the user.

The instructions, which, when executed, cause the processor to determine the wearing state of the electronic device based on the location of the eye or the pupil of the user displayed in each of the image captured by the first sensor and the image captured by the second sensor.

The instructions, which, when executed, cause the processor to determine the wearing state of the electronic device based on a direction that the right eye of the user displayed in the image captured by the first sensor faces from a center of the image captured by the first sensor and a direction that the left eye of the user displayed in the image captured by the second sensor faces from a center of the image captured by the second sensor.

The instructions, which, when executed, cause the processor to determine the wearing state of the electronic device based on whether the direction which the right eye of the user faces from the center of the image and the direction which the left eye of the user faces from the center of the image correspond to a reference line.

The instructions, which, when executed, cause the processor to determine the wearing state of the electronic device based on whether the right pupil of the user displayed in the image captured by the first sensor is located at a central area of the image captured by the first sensor and whether the left pupil of the user displayed in the image captured by the second sensor is located at a central area of the image captured by the second sensor.

The instructions, which, when executed, cause the processor to determine the wearing state of the electronic device based on whether the right pupil of the user displayed in the image captured by the first sensor is located at a central area of the right eye of the user displayed on the image captured by the first sensor and whether the left pupil of the user displayed in the image captured by the second sensor is located at a central area of the left eye of the user displayed on the image captured by the second sensor.

The memory may further include instructions, which, when executed by the processor, cause the processor to generate a screen to be provided to the right eye of the user and a screen to be provided to the left eye of the user and to provide the generated two screens to the display at the same time.

The memory may further include instructions, which, when executed by the processor, cause the processor to adjust a distance between the generated two screens based on the location of the eye or the pupil of the user included in each of the image captured by the first sensor and the image captured by the second sensor.

The instructions, which, when executed, cause the processor to align the screen to be provided for the right eye of the user with the right eye of the user and to align the screen to be provided for the left eye of the user with the left eye of the user.

The memory may further include instructions, which, when executed by the processor, cause the processor to provide a guide screen (hereinafter referred to as a "second guide screen") that allows the user to track an object moving on the display with the eye of the user to the display, to capture a plurality of images, in which at least a portion of the eye of the user is included, using the sensor while the second guide screen, which allows the user to track the object moving on the display with the eye of the user, is provided, and to determine a distance between two corresponding screens, which are to be provided to the display at the same time, based on the plurality of captured images.

According to various embodiments of the present invention, the guide screen that allows the user to track the object moving on the display with the eye may include a guide screen for the right eye of the user and a guide screen for the left eye of the user.

The capturing of the image and the determining of the wearing state of the electronic device may be performed at a preset time or by a user request.

The memory may further include instructions, which, when executed by the processor, cause the processor to perform user authentication by analyzing an iris of the user displayed in the captured image.

A method performed in an electronic device that is mountable on a head of a user includes providing a guide screen that allows the user to gaze at a front of a display, capturing an image, in which at least a portion of an eye of the user is included, using a sensor, and determining a wearing state of the electronic device based on a location of the eye or a pupil of the user displayed in the captured image.

The method may further include generating a guide screen associated with the wearing state of the electronic device based on the determination result and providing the generated guide screen to the display.

According to various embodiments of the present invention, the sensor may include a first sensor that captures an image of a right eye of the user and a second sensor that captures an image of a left eye of the user, wherein the method may further include generating a first screen to be provided to the right eye of the user and a second screen to be provided to the left eye of the user and providing the generated two screens to the display at the same time.

The method may further include adjusting a distance between the generated two screens based on the location of the eye or the pupil of the user included in each of the image captured by the first sensor and the image captured by the second sensor.

An electronic device detachably coupled to a head-mounted device mountable on a head of a user may include a display, a first sensor, a processor electrically connected with the display and the first sensor, and a memory electrically connected with the processor. The memory may store instructions, which, when executed by the processor, cause the processor to detect whether the electronic device is coupled to the head-mounted device, to obtain first information associated with a location of an eye of the user on the display through the first sensor of the electronic device or a second sensor included in the head-mounted device in a first state where the user wears the head-mounted device, to display a first user interface on at least a partial area of the display based at least in part on the first information, to obtain second information associated with a location of the eye of the user on the display through the first sensor or the second sensor in a second state where the user wears the head-mounted device, to change at least a portion of the first user interface so as to indicate that the first state is changed to the second state, based at least in part on the second information, and to display a second user interface in connection with the at least partially changed first user interface, based on determining that the second information is substantially the same as selected information.

The first state may mean a state where a user wears a head-mounted device (HMD) for the first time, and the second state may mean a state where the user wears the device after adjusting a wearing state of the device through the first user interface. The second state may be a state where the user wears the device correctly or may be a state where the user does not correctly wear the device. The first user interface may be a guide screen (e.g., the guide screen 600 of FIG. 6) that guides the user to wear the HMD correctly, and the second user interface may be a notification screen indicating that the user wears the HMD correctly.

The second user interface may mean that at least a portion of the partially changed first user interface is changed.

The second user interface may be displayed to overlap at least a portion of the at least partially changed first user interface.

Third information associated with an iris of the user may be obtained through the first sensor or the second sensor, and the user may be authenticated based on the third information.

A non-transitory machine-readable storage medium may store instructions, which, when executed by at least one processor, cause obtaining first information associated with a location of an eye of a user in a first state where the user wears a head-mounted device, using a sensor which is electrically connected with the processor and is included in the head-mounted device mountable on a head of the user, displaying a first user interface on at least a partial area of a display of the head-mounted device based at least in part on the first information, obtaining second information associated with a location of the eye in a second state where the user wears the head-mounted device, using the sensor, changing at least a portion of the first user interface so as to indicate that the first state is changed to the second state, based at least in part on the second information, and displaying a second user interface in connection with the at least partially changed first user interface, based on determining that the second information is substantially the same as selected information.

A head-mounted device mountable on a head of a user may include a camera, a first mechanism including a first light-emitting part, a first reflecting part, and a first sensor, a second mechanism including a second light-emitting part, a second reflecting part, and a second sensor, a processor electrically connected with the camera, the first mechanism, and the second mechanism, and a memory electrically connected with the processor. The memory may store instructions, which, when executed by the processor, cause the processor to obtain a first image based on the result of detecting, through the first sensor, a first reflected light that is obtained by reflecting a first light emitted from the first emitting part by the first reflecting part, to obtain a second image based on the result of detecting, through the second sensor, a second reflected light that is obtained by reflecting a second light emitted from the second emitting part by the second reflecting part, to obtain at least one stereoscopic image by using the first image and the second image, and to correct the at least one stereoscopic image by arranging the first image and the second image based on a location of an eye of the user obtained through the camera.

The term "module" as used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment of the present disclosure may be, for example, implemented by instructions stored in a computer-readable storage media in the form of a program module. The instructions, when executed by the processor 120, may cause the one or more processors to perform a function corresponding to the instructions. The computer-readable storage media, for example, may be the memory 130.

The computer-readable storage media may include a hard disk, a floppy disk, a magnetic media (e.g., a magnetic tape), an optical media (e.g., a compact disc read only memory (CD-ROM) and a digital versatile disc (DVD)), a magneto-optical media (e.g., a floptical disk), and hardware devices (e.g., a read only memory (ROM), a random access memory (RAM), or a flash memory). Also, a program instruction may include not only code generated by a compiler but also a high-level language code executable on a computer using an interpreter. The above hardware unit may be configured to operate via one or more software modules for performing an operation of the present disclosure, and vice versa.

A module or a program module according to an embodiment of the present disclosure may include at least one of the above elements, or a part of the above elements may be omitted, or additional other elements may be further included. Operations performed by a module, a program module, or other elements according to an embodiment of the present disclosure may be executed sequentially, in parallel, repeatedly, or in a heuristic method. In addition, a part of operations may be executed in different sequences or may be omitted. Alternatively, other operations may be added.

According to an embodiment of the present disclosure, an electronic device may provide an appropriate wearing guide to the user by determining the user wearing state of the electronic device.

Accordingly, it may be possible to automatically provide an optimum environment for content to be provided to the user by adjusting a screen to be provided to the user to be suitable for a distance between two eyes of the user.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device operatively coupled to an external device mountable on a head of a user, the electronic device comprising:
    a display;
    a sensor configured to capture an image;
    a processor; and
    a memory, which includes instructions, which, when executed, cause the processor to:
    provide a first guide screen that guides the user to gaze at a front of the display;
    capture an image, in which at least a portion of an eye of the user is included, using the sensor; and
    based on a location of the eye or a pupil of the user displayed in the captured image that deviates from a specified area, display a second guide screen that guides the user to shift the external device in a correct direction.

2. The electronic device of claim 1, wherein the sensor comprises a first sensor that captures an image of a right eye of the user and a second sensor that captures an image of a left eye of the user.

3. The electronic device of claim 2, wherein the instructions, which, when executed by the processor, cause the processor to:
    determine whether the user raises his or her eyes while wearing the external device incorrectly based on the location of the eye and the location of the pupil of the user displayed in each of the image captured by the first sensor and the image captured by the second sensor, and
    based on whether the user raises his or her eyes while wearing the external device incorrectly, display a third guide screen that guides the user to move the external device downward and does not cause the user to raise his or her eyes.

4. The electronic device of claim 2, wherein the instructions, which, when executed by the processor, cause the processor to determine whether the right pupil of the user displayed in the image captured by the first sensor is located at a central area of the image captured by the first sensor and whether the left pupil of the user displayed in the image captured by the second sensor is located at a central area of the image captured by the second sensor.

5. The electronic device of claim 2, wherein the instructions, which, when executed by the processor, cause the processor to generate a first screen to be provided to the right eye of the user and a second screen to be provided to the left eye of the user and to provide the first screen and the second screen to the display at the same time.

6. The electronic device of claim 5, wherein the instructions, which, when executed by the processor, cause the processor to adjust a distance between the first screen and the second screen based on the locations of the eyes or the pupils of the user included in each of the image captured by the first sensor and the image captured by the second sensor.

7. The electronic device of claim 6, wherein the instructions, which, when executed by the processor, cause the processor to align the first screen with the right eye of the user and to align the second screen with the left eye of the user.

8. The electronic device of claim 1, wherein the instructions, which, when executed by the processor, cause the processor to:
    provide a third guide screen that allows the user to track an object moving on the display;
    capture a plurality of images, in which at least a portion of the eye of the user is included, using the sensor; and
    determine a distance between two corresponding screens, which are provided to the display at the same time, based on the plurality of images.

9. The electronic device of claim 8, wherein the third guide screen comprises a guide screen for the right eye of the user and a guide screen for the left eye of the user.

10. The electronic device of claim 1, wherein the memory further includes instructions, which, when executed by the processor, cause the processor to perform user authentication by analyzing an iris of the user displayed in the captured image.

11. A method performed in an electronic device operatively coupled to an external device that is mountable on a head of a user, the method comprising:
    providing a first guide screen that guides the user to gaze at a front of a display;

capturing an image, in which at least a portion of an eye of the user is included, using a sensor; and based on a location of the eye or a pupil of the user displayed in the captured image that deviates from a specified area, displaying a second guide screen that guides the user to shift the external device in a correct direction.

12. The method of claim 11, wherein the sensor comprises a first sensor that captures an image of a right eye of the user and a second sensor that captures an image of a left eye of the user, wherein the method further comprises:

generating a first screen to be provided to the right eye of the user and a second screen to be provided to the left eye of the user; and providing the first screen and the second screen to the display at the same time.

13. The method of claim 12, further comprising:

adjusting a distance between the first screen and the second screen based on at least one of the location of the eye and the location of the pupil of the user included in each of the image captured by the first sensor and the image captured by the second sensor.

* * * * *